United States Patent
Mallette et al.

(10) Patent No.: US 11,518,453 B2
(45) Date of Patent: Dec. 6, 2022

(54) REAR SUSPENSION ASSEMBLY FOR A SNOWMOBILE

(71) Applicant: BOMBARDIER RECREATIONAL PRODUCTS INC., Valcourt (CA)

(72) Inventors: Bertrand Mallette, Sherbrooke (CA); Jerome Chapdelaine, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/107,133

(22) Filed: Nov. 30, 2020

(65) Prior Publication Data
US 2021/0163086 A1 Jun. 3, 2021

Related U.S. Application Data

(60) Provisional application No. 62/941,958, filed on Nov. 29, 2019.

(51) Int. Cl.
*B62D 55/112* (2006.01)
*B62M 27/02* (2006.01)

(52) U.S. Cl.
CPC ........... *B62D 55/112* (2013.01); *B62M 27/02* (2013.01); *B62M 2027/026* (2013.01)

(58) Field of Classification Search
CPC ........... B62M 27/02; B62M 2027/026; B62D 55/112; B62D 55/104
USPC ......................................... 305/127; 384/255
See application file for complete search history.

(56) References Cited

U.S. PATENT DOCUMENTS

| | | | | |
|---|---|---|---|---|
| 3,945,451 A * | 3/1976 | Aaen | ...................... | B62D 55/07 180/9.52 |
| 5,692,579 A * | 12/1997 | Peppel | .................. | B62D 55/108 180/190 |
| 6,206,124 B1 * | 3/2001 | Mallette | ............... | B62D 55/104 180/193 |
| 6,283,241 B1 * | 9/2001 | Kubota | .................. | B62M 27/02 180/193 |
| 7,854,285 B1 * | 12/2010 | Giese | ..................... | B62M 27/02 180/193 |
| 8,430,415 B2 * | 4/2013 | Earle | ...................... | B62K 25/20 280/284 |
| 10,005,506 B2 * | 6/2018 | Muehlfeld | ........... | B62D 55/108 |
| 11,059,337 B2 * | 7/2021 | Hoyer | .................... | B60G 7/001 |

(Continued)

OTHER PUBLICATIONS

Polaris; Polaris Parts Online; Rear Suspension; retrieved from https://www.polarispartsonline.ca/oem-parts?aribrand=POL_CDN#/Polaris_(Canada)/S12MX6JSA%2f%2fJEA_600_IQ_RACER%2f%2fINTL_(2012)_(S12MX6JSA%2f%2fJEA)/SUSPENSION%2c_REAR_-_S12MX6JSA%2f%2fJEA_(49SNOWSUSPRR12600RCR)/3A04DCDE-C9C1-487E-A25A-EED6D5C0BF84/204B21F1-6402-46D2-BBDD-30C2DE39681B/y on Nov. 19, 2020; copyright 2011 Polaris Sales Inc.

(Continued)

*Primary Examiner* — Anne Marie M Boehler
(74) *Attorney, Agent, or Firm* — BCF LLP

(57) ABSTRACT

A snowmobile has a rear suspension assembly including at least one slide rail, a plurality of idler wheels, a front suspension arm having first upper and lower ends, and a rear suspension arm having second upper and lower ends. The first upper end is connected to a tunnel of the snowmobile. The first lower end is selectively connected to the at least one slide rail. The first lower end is connectable to the at least one slide rail at first and second positions. The first position of the first lower end is vertically higher from a (Continued)

bottom surface of the at least one slide rail than the second position of the first lower end. The second upper end is connected to the tunnel.

19 Claims, 18 Drawing Sheets

(56) References Cited

U.S. PATENT DOCUMENTS

| | | | |
|---|---|---|---|
| 2006/0169510 A1* | 8/2006 | Visscher | B62M 27/00 180/193 |
| 2013/0270020 A1* | 10/2013 | Gagnon | B62M 27/02 180/193 |
| 2014/0049020 A1* | 2/2014 | Wendt | B62K 25/02 280/259 |
| 2015/0034404 A1* | 2/2015 | Polakowski | B62M 27/02 180/193 |
| 2016/0121970 A1* | 5/2016 | Labbe | B62M 27/02 180/193 |

OTHER PUBLICATIONS

Polaris; Polaris Parts Online; Front Suspension; retrieved from https://www.polarispartsonline.ca/oem-parts?aribrand=POL_CDN#/Polaris_(Canada)/S12MX6JSA%2f%2fJEA_600_IQ_RACER%2f%2fINTL_(2012)_(S12MX6JSA%2f%2fJEA)/SUSPENSION%2c_TORQUE_ARM%2c_FRONT_-_S12MX6JSA%2f%2fJEA_49SNOWFTA11600RCR)/3A04DCDE-C9C1-487E-A25A-EED6D5COBF84/7BB5E51B-FB13-430B-81F0-F5DFE36B7E43/y on Nov. 19, 2020; copyright 2010 Polaris Sales Inc.

* cited by examiner

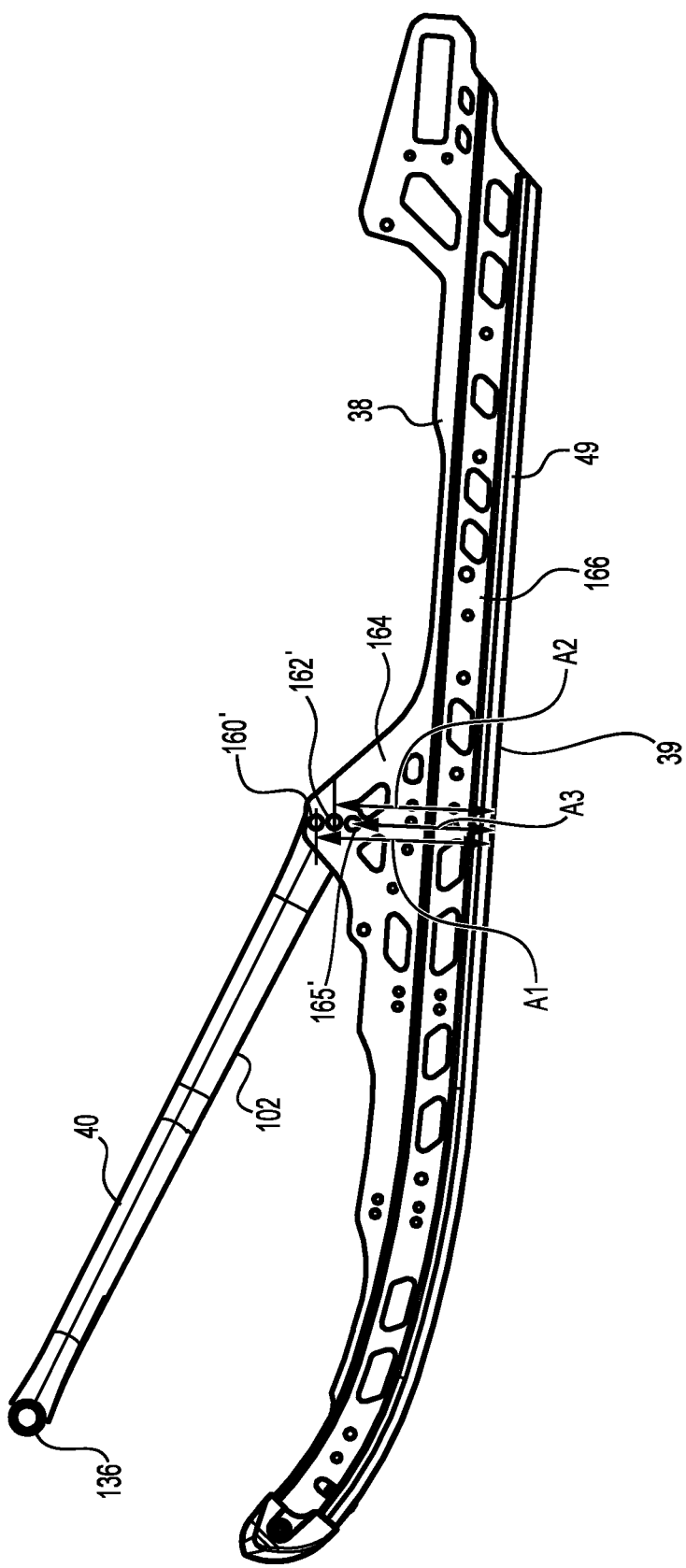

REAR SUSPENSION ASSEMBLY FOR A SNOWMOBILE

CROSS REFERENCE

The present application claims priority from U.S. Provisional Patent Application No. 62/941,958, filed on Nov. 29, 2019, the entirety of which is incorporated by reference herein.

TECHNICAL FIELD

The present relates to rear suspension assemblies for snowmobiles.

BACKGROUND

The particular design of a snowmobile's rear suspension assembly has a substantial impact on the dynamic behavior of the snowmobile. For instance, the lengths of the rear suspension assembly's front and rear suspension arms as well as the angles formed thereby can impact how the rear suspension assembly responds during use. Therefore, different settings in a conventional snowmobile's rear suspension assembly are adjustable to modify the behavior of the snowmobile.

However, changing one setting in the rear suspension assembly often affects more than one particular aspect of the behavior of the snowmobile. Thus, while a user may want to change one aspect of the snowmobile's behavior, adjusting any one of the settings that are adjustable in the rear suspension assembly often also alters other aspects of the behavior of the snowmobile.

Therefore, there is a need for a snowmobile that addresses at least some of these drawbacks.

SUMMARY

It is an object of the present technology to ameliorate at least some of the inconveniences present in the prior art.

According to an aspect of the present technology, there is provided a snowmobile. The snowmobile includes: a frame including a tunnel; a motor supported by the frame; a front suspension assembly connected to the frame; at least one ski connected to the front suspension assembly; a drive track operatively connected to the motor for propelling the snowmobile on the ground; and a rear suspension assembly. The rear suspension assembly includes: at least one slide rail extending generally longitudinally, the at least one slide rail having a bottom surface; a plurality of idler wheels connected to the at least one slide rail, the drive track being tensioned about the plurality of idler wheels; a front suspension arm having a first upper end and a first lower end, the first upper end being connected to the tunnel, the first lower end being selectively connected to the at least one slide rail, the first lower end being connectable to the at least one slide rail at a first position or at a second position, the first position of the first lower end being vertically higher from the bottom surface of the at least one slide rail than the second position of the first lower end; and a rear suspension arm having a second upper end and a second lower end, the second upper end being connected to the tunnel.

In some embodiment, in the first position the first lower end defines a first point about an arc centered about the first upper end; and in the second position, the first lower end defines a second point about the arc.

In some embodiments, the first upper end is in a generally same vertical position when the first lower end is in the first position and when the first lower end is in the second position.

In some embodiments, in the first position of the first lower end, the front suspension arm forms a first angle with the at least one slide rail; in the second position of the first lower end, the front suspension arm forms a second angle with the at least one slide rail; and the second angle is greater than the first angle.

In some embodiments, the arc is centered about a pivot defined by the first upper end.

In some embodiments, the second upper end of the rear suspension arm is pivotable relative to the tunnel about a second upper end axis; and when under identical conditions, a vertical distance between the second upper end axis and the at least one slide rail is the same when the first lower end is in the first position and when the first lower end is in the second position.

In some embodiments, the at least one slide rail defines a first opening and a second opening; the first opening is centered about a first axis; the second opening is centered about a second axis extending parallel to the first axis; when the first lower end of the front suspension arm is in the first position, the first lower end is connected to the at least one slide rail via the first opening and pivots about the first axis; and when the first lower end of the front suspension arm is in the second position, the first lower end is connected to the at least one slide rail via the second opening and pivots about the second axis.

In some embodiments, the first opening and the second opening are in communication with one another so as to form a common aperture.

In some embodiments, the snowmobile also includes at least one adjustable member selectively connected to the at least one slide rail in one of a first orientation and a second orientation. Each adjustable member of the at least one adjustable member includes: a body portion defining a body opening; a protrusion extending from the body portion, the protrusion being sized and shaped to fit into either one of the first opening and the second opening of the at least one slide rail. In the first orientation, the protrusion of the at least one adjustable member is inserted in the second opening of the at least one slide rail while the body opening is aligned with the first opening, the first lower end of the front suspension arm being in the first position, a fastener extending through the body opening and the first lower end to connect the first lower end to the at least one slide rail. In the second orientation, the protrusion of the at least one adjustable member is inserted in the first opening of the at least one slide rail while the body opening is aligned with the second opening, the first lower end of the front suspension arm being in the second position, the fastener extending through the body opening and the first lower end to connect the first lower end to the at least one slide rail.

In some embodiments, the body portion is generally circular; and the protrusion and the body opening are eccentric relative to the generally circular shape of the body portion.

In some embodiments, the rear suspension assembly also includes at least one rocker arm connected between the at least one slide rail and the rear suspension arm, the second lower end of the rear suspension arm being connected to the at least one rocker arm.

In some embodiments, the rear suspension assembly also includes at least one coupling block connected to the at least one slide rail, the at least one coupling block being configured to limit displacement of the at least one rocker arm.

In some embodiments, the at least one slide rail includes a first slide rail and a second slide rail.

In some embodiments, the at least one adjustable member includes a first adjustable member and a second adjustable member; the first adjustable member is selectively connected to the first slide rail in one of the first orientation and the second orientation; the second adjustable member is selectively connected to the second slide rail in one of the first orientation and the second orientation; and the first and second adjustable members are in the same one of the first orientation and the second orientation.

In some embodiments, the rear suspension assembly also includes: a front shock absorber connected between the front suspension arm and the at least one slide rail; and a rear shock absorber connected between the front suspension arm and the rear suspension arm.

In some embodiments, the first lower end is connected to each slide rail of the at least one slide rail via a bushing and a bolt extending through the slide rail and into the bushing.

For purposes of this application, terms related to spatial orientation when referring to the vehicle orientation such as forwardly, rearwardly, left, and right are as they would normally be understood by a driver of the vehicle sitting thereon in a normal riding position.

Embodiments of the present each have at least one of the above-mentioned aspects, but do not necessarily have all of them.

Additional and/or alternative features, aspects, and advantages of embodiments of the present will become apparent from the following description, the accompanying drawings, and the appended claims.

BRIEF DESCRIPTION OF THE DRAWINGS

For a better understanding of the present, as well as other aspects and further features thereof, reference is made to the following description which is to be used in conjunction with the accompanying drawings, where:

FIG. 15 is a left side elevation view of the left slide rail and the front suspension of the rear suspension arm in accordance with yet another embodiment.

DETAILED DESCRIPTION

Figure 1:
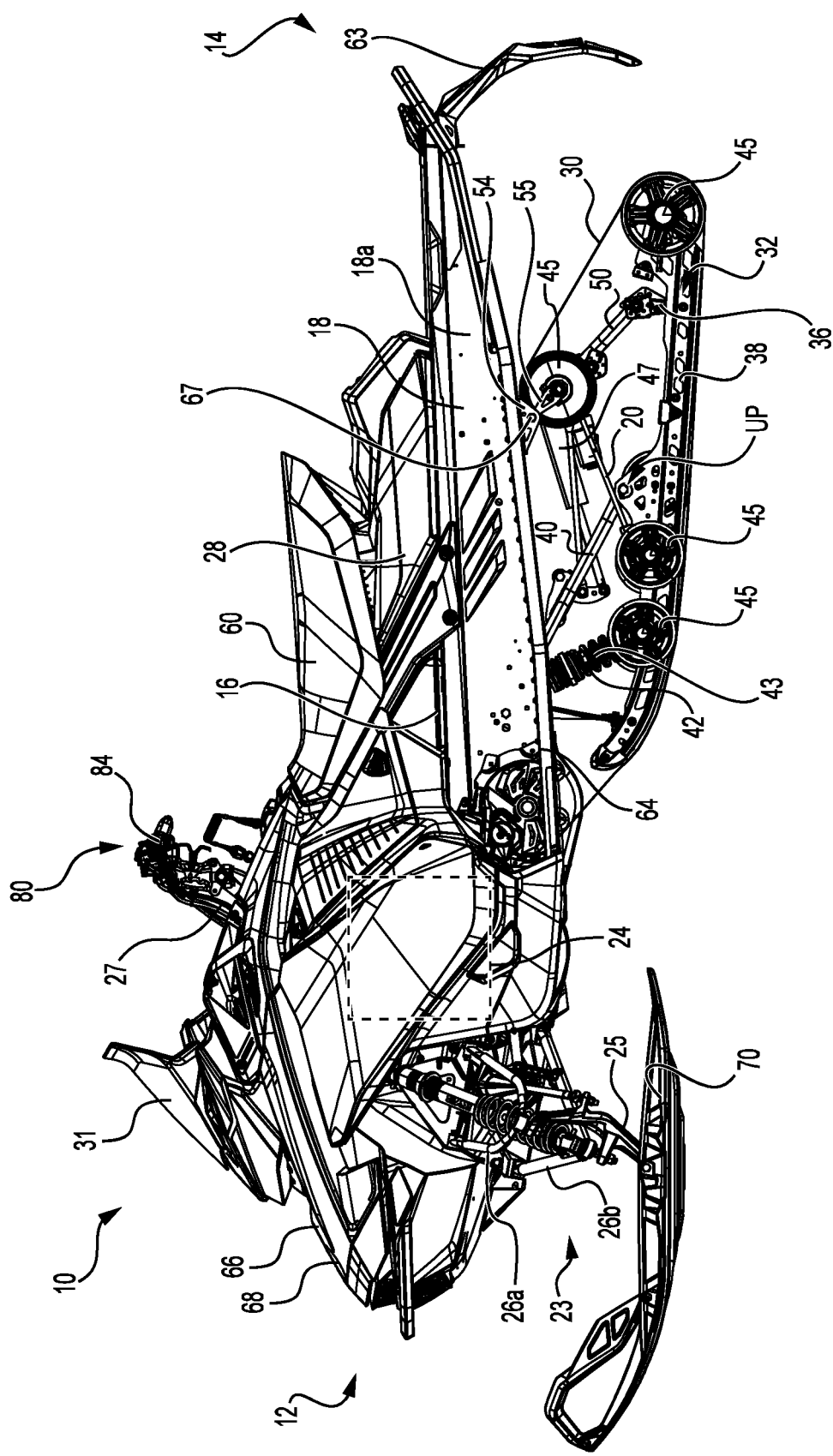
FIG. 1 is a left side elevation view of a snowmobile in accordance with an embodiment of the present technology.
Figure 2:
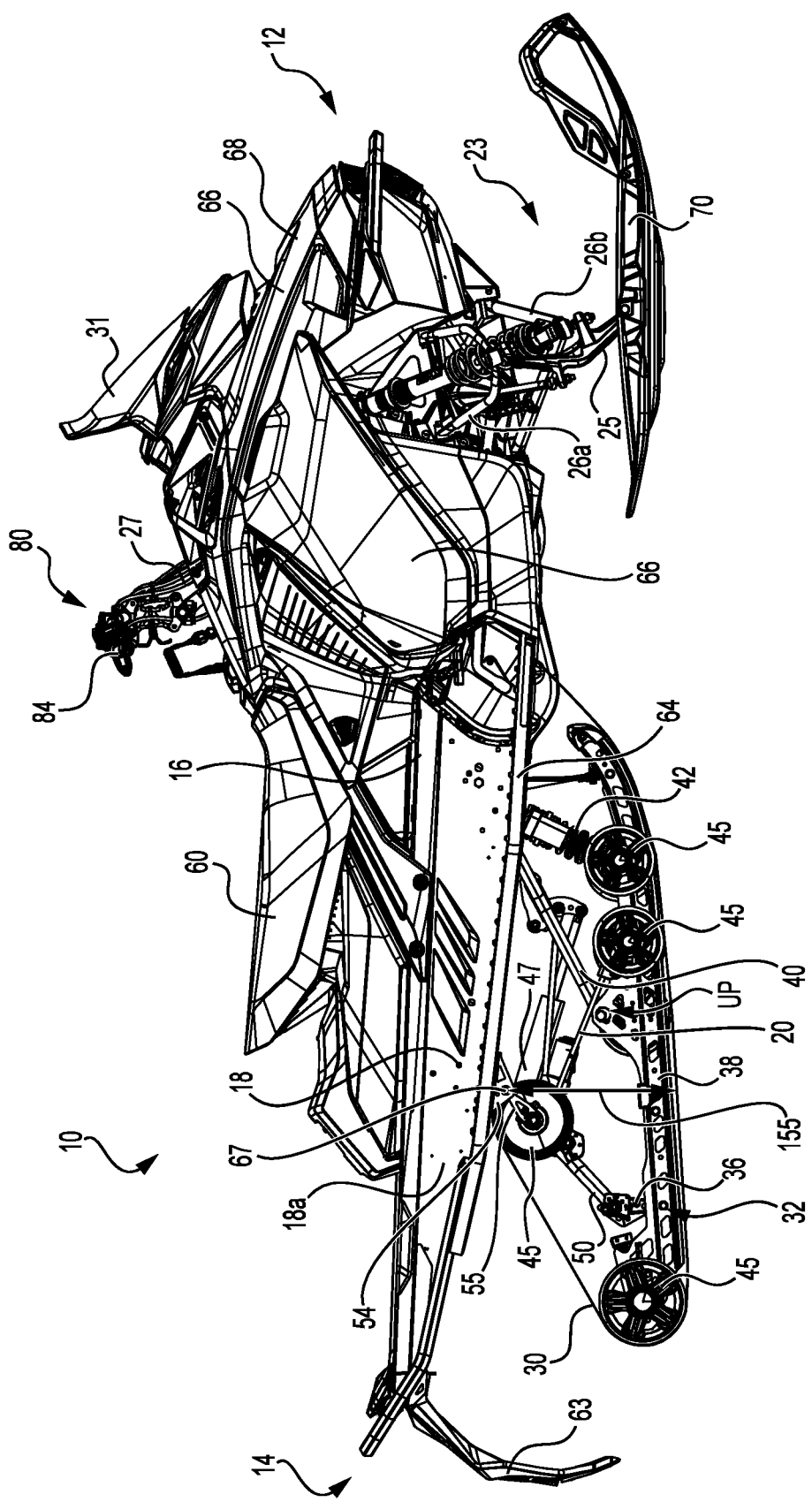
FIG. 2 is a right side elevation view of the snowmobile of FIG. 1.

A snowmobile 10 in accordance with an embodiment of the present technology is shown in FIGS. 1 and 2. The snowmobile 10 has a front end 12 and a rear end 14 which are defined consistently with a travel direction of the snowmobile 10. The snowmobile 10 has a frame 16, which includes a rear tunnel 18. The tunnel 18 is formed from sheet metal parts assembled to form an inverted U-shape when viewed from the front or rear end 12, 14. The inverted U-shaped tunnel 18 has a left side portion 18a and a right side portion 18a.

A ski and steering assembly is provided, in which two skis 70 are positioned at the front end 12 of the snowmobile 10, and are attached to a front suspension assembly portion of the frame 16 through front suspension assemblies 23.

Each front suspension assembly 23 includes a ski leg 25, supporting arms 26a, 26b, a spindle and ball joints for operatively joining the ski leg 25, supporting arms 26a, 26b and a steering column 27. The supporting arms 26a, 26b includes left and right upper A-arms 26a and left and right lower A-arms 26b. It is contemplated that the front suspension assemblies 23 could be different from the double A-arm suspension described above.

A steering assembly 80, including the steering column 27 and a handlebar 84, is provided generally forward of the seat 60. The steering column 27 is rotatably connected to the frame 16. The handlebar 84 is connected to the upper end of the steering column 27. The handlebar 84 is used to rotate the steering column 27, and thereby the skis 70, in order to steer the snowmobile 10.

A motor 24 (illustrated schematically in FIG. 1) is supported by an engine compartment defined by the frame 16 and provides, in part, propulsion of the snowmobile 10. In this embodiment, the motor 24 is an internal combustion engine. However, it is contemplated that the engine 24 could be an electric motor or a hybrid in other embodiments. A fuel tank 28, supported above the tunnel 18, supplies fuel to the engine 24 for its operation.

An endless drive track 30 is positioned generally under the tunnel 18, and is operatively connected to the engine 24 via a drivetrain including a belt transmission system (not shown) that is well known in the art. The drive track 30 is driven to run about the rear suspension assembly 32 for propulsion of the snowmobile 10. The drive track 30 is engaged with and driven by a drive sprocket (not shown) which is journaled by the tunnel 18 and is driven by the engine 24 through the belt transmission system.

A snow flap 63 is connected to a rear end of the tunnel 18 to protect against snow and dirt that could be projected from the drive track 30 when driving. It is contemplated that the snow flap 63 could be omitted.

A straddle seat 60 is positioned atop the fuel tank 28, rearward of the handlebar 84. The seat 60 is adapted to accommodate a driver of the snowmobile 10. It is contemplated that the seat 60 could also be configured to accommodate one or more passengers. It is also contemplated that the snowmobile 10 could include one or more additional seats for passengers. A footrest 64 is positioned on each side of the snowmobile 10 below the seat 60 to accommodate the driver's feet. Each of the left and right footrests 64 extends generally laterally outwardly from the corresponding left and right side portion of the tunnel 18. In this embodiment, each side portion 18a of the tunnel 18 is bent laterally outwardly at its bottom edge to form the corresponding footrest 64. It is however contemplated that the footrest 64 could be formed separately from and mounted to the tunnel 18.

At the front end 12 of the snowmobile 10, cowls 66 (also referred to as fairings 66) enclose the engine 24, the transmission system and other components of the power pack such as the air intake system. The cowls 66 include a hood 68 which can be opened to allow access to the engine 24 and other internal components of the snowmobile 10 from the top and the front which may be useful, for example, for inspection or maintenance of the engine 24 and/or the power pack. The engine 24 and the transmission system are disposed between right and left side cowls 66. The side cowls 66 are both removably connected to the frame 16 and/or to other cowls (not separately labeled) and can be removed to access the internal components from the corresponding lateral side.

A windshield 31 is connected to the fairings cowls 66 near the front end 12 of the snowmobile 10. Alternatively, the windshield 31 can be attached directly to the handlebar 84. The windshield 31 acts as a windscreen to lessen the force of the air on the user while the snowmobile 10 is moving.

The rear suspension assembly 32 in accordance with the present technology will now be described in detail.

Figure 5:
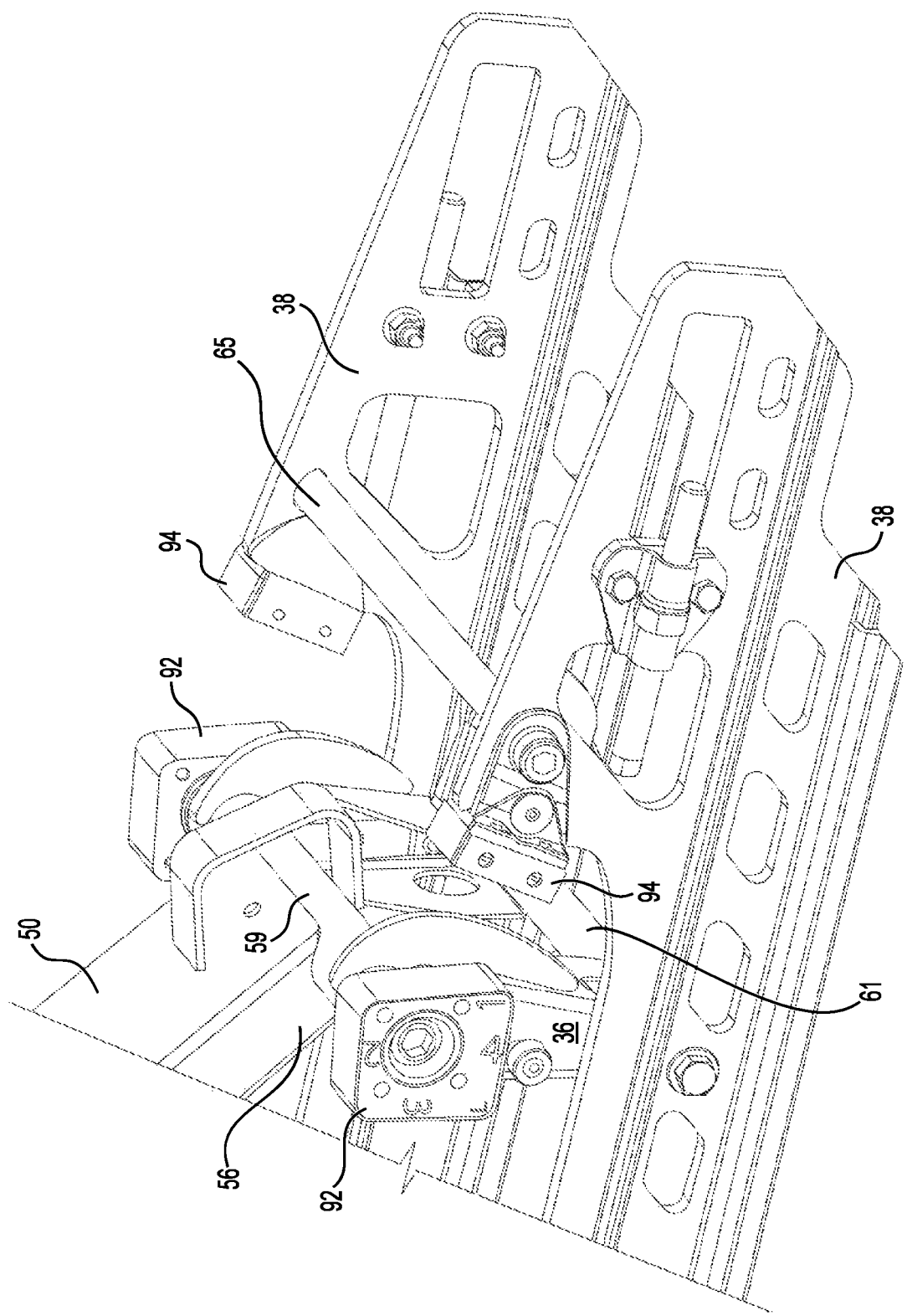
FIG. 5 is a perspective view, taken from a rear, left side of a rear part of the rear suspension assembly of FIG. 3.

As can be seen in FIGS. 1 and 2, the rear suspension assembly 32 has a slide frame assembly including left and right slide rails 38 which extend generally longitudinally and are laterally spaced apart from one another. The slide rails 38 are in sliding contact with the drive track 30. Notably, each slide rail 38 is provided with a respective slide shoe 49 (FIG. 7A) which has a bottom surface 39 that engages the inner side of the ground-engaging portion of the drive track 30 to reduce friction between the slide rail 38 and the drive track 30. The slide frame assembly also includes shafts 65 (one of which is shown in FIG. 5) interconnecting the two slide rails 38. A plurality of idler wheels 45 are connected to the slide rails 38 and are rotatable relative thereto. The drive track 30 is tensioned about the idler wheels 45.

Figure 6:
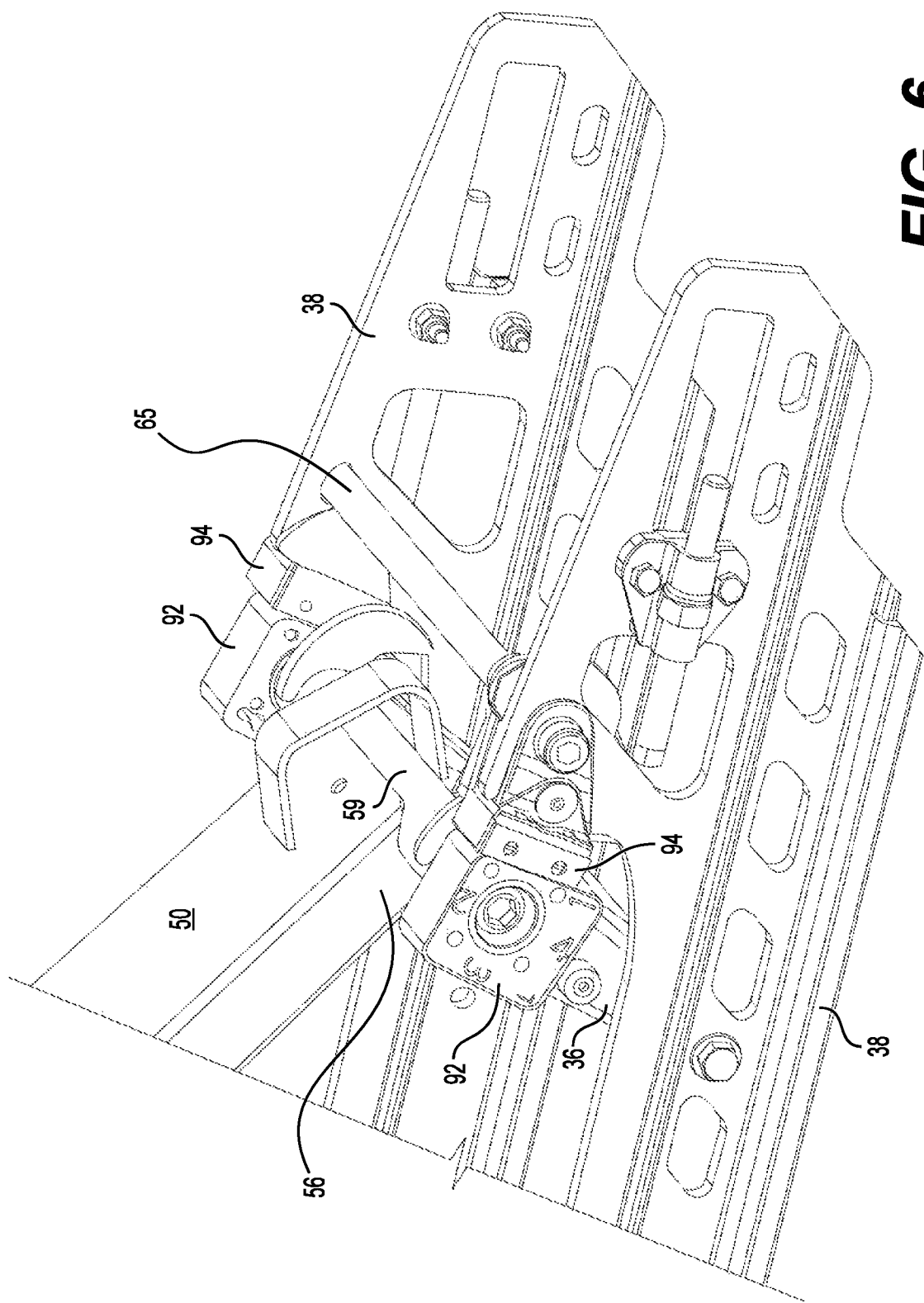
FIG. 6 is a perspective view, taken from a rear, left side, of the rear part of the rear suspension assembly of FIG. 5, with coupling blocks of the rear suspension assembly being abutted by rear stoppers.

The slide rails 38 are connected to the tunnel 18 via front and rear suspension arms 40, 50. The rear suspension arm 50 is disposed rearwardly of the front suspension arm 40 and extends from an upper end 52 to a lower end 56. The upper end 52 of the rear suspension arm 50 includes left and right shaft portions (not shown) which, in this embodiment, are integral with the rear suspension arm 50. Two idler wheels 45 of the rear suspension assembly 32 (which can be referred to as the two upper rear idler wheels 45) are mounted to the left and right shaft portions of the upper end 52 respectively. As shown in FIGS. 1 and 2, left and right arms 55 are fixed at a first end thereof to the left and right shaft portions of the upper end 52 of the rear suspension arm 50 respectively. Notably, the left and right arms 55 are disposed laterally outwardly of the two upper rear idler wheels 45. At a second end thereof, the left and right arms 55 are pivotally connected to the tunnel 18 via left and right upper connecting brackets 54 (FIGS. 1, 2). The left and right upper connecting brackets 54, which are connected to the tunnel 18, thus define an upper pivot axis 67 about which the rear suspension arm 50 pivots. The lower end 56 of the rear suspension arm 50 is connected to the slide rails 38 via left and right rocker arms 36. Notably, as shown in FIGS. 5 and 6, upper ends of the left and right rocker arms 36 are pivotably connected to a shaft (not shown) extending through a hollow shaft 59. The shaft rotates within the hollow shaft 59 such that the rocker arms 36 can rotate with respect to the lower end 56 of the rear suspension arm 50. Each of the left and right rocker arms 36 is fixedly connected at its lower end to a tube 61 extending between the slide rails 38. Inside the tube 61 is a shaft connected between rear portions of the slide rails 38. The tube 61 rotates about the shaft, allowing the rocker arms 36 to rotate with respect to the slide rails 38. It is contemplated that, in other embodiments, the rocker arms 36 could be omitted and that the rear suspension arm 50 could be pivotably connected directly to the slide rails 38.

Figure 3:
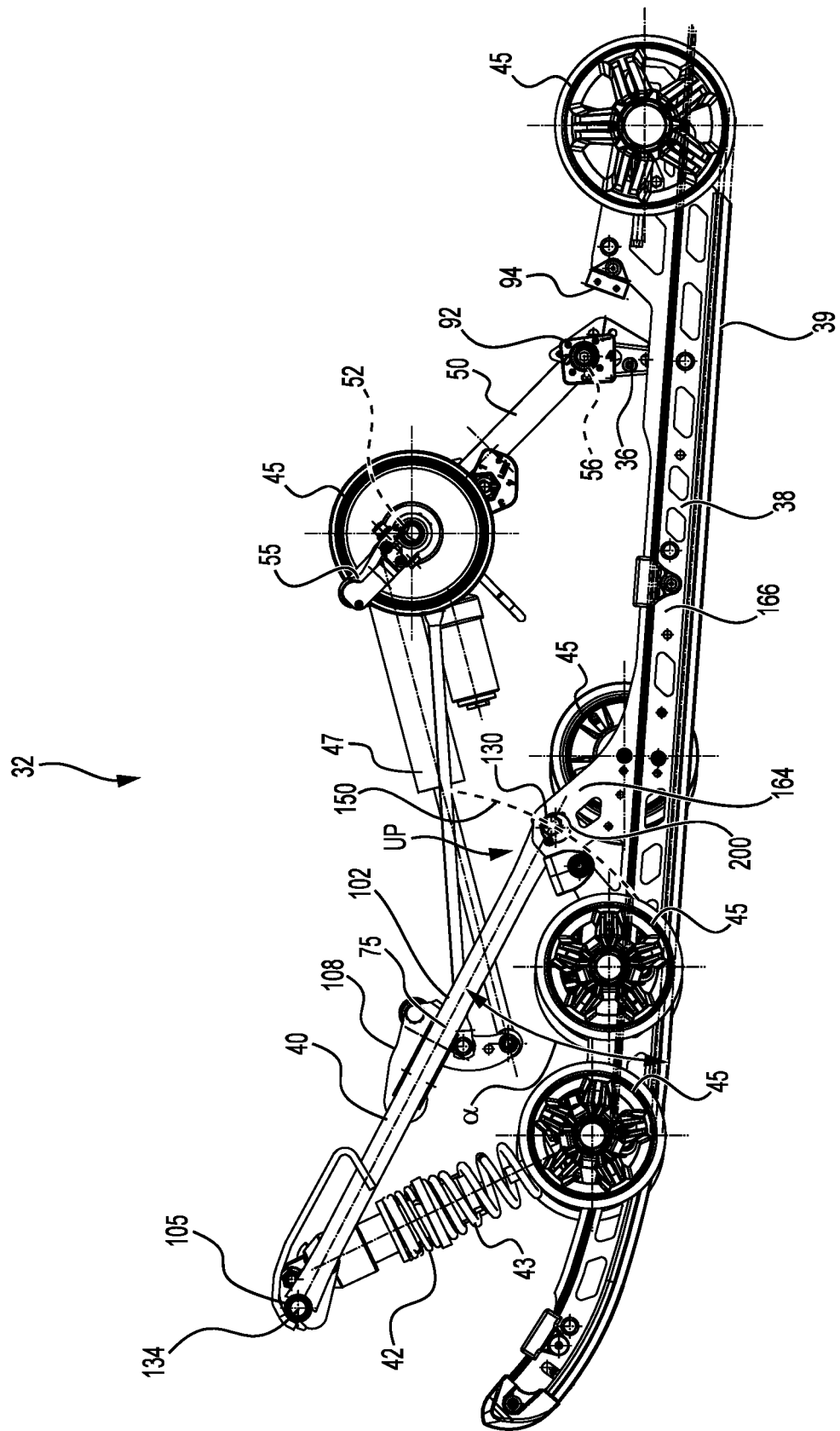
FIG. 3 is a left side elevation view of a rear suspension assembly of the snowmobile of FIG. 1, with a lower end of a front suspension arm thereof being in an upper position.
Figure 4:
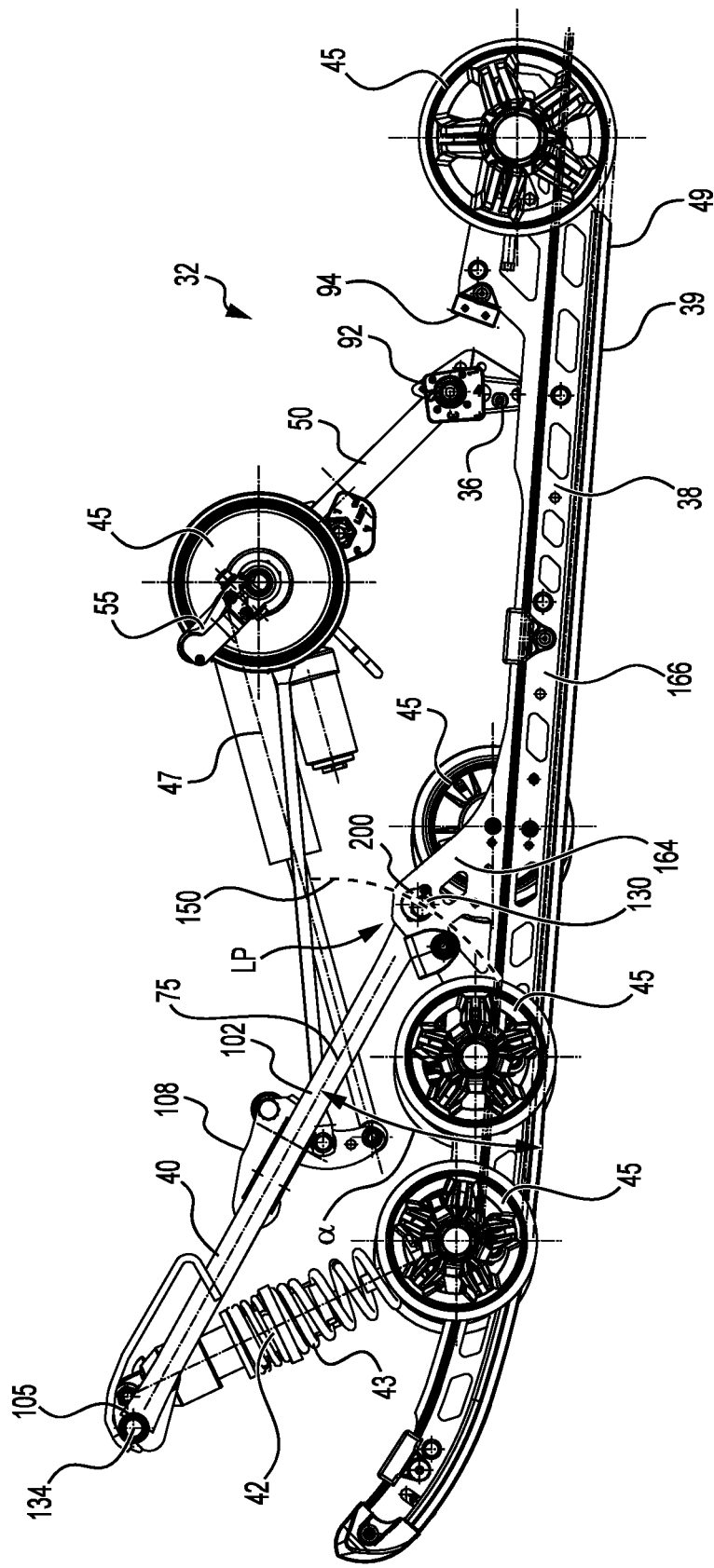
FIG. 4 is a left side elevation view of the rear suspension assembly of FIG. 3, with the lower end of the front suspension arm being in a lower position.

As shown in FIGS. 3 and 4, a rear shock absorber 47 extends forwardly and downwardly from the upper end of the rear suspension arm 50, and is disposed at least in part rearwardly of the front suspension arm 40. More specifically, the shock absorber 47 is pivotally connected at its upper end to a rear bracket (not shown) connected to the upper end 52 of the rear suspension arm 50. A lower end of the shock absorber 47 is pivotally connected to the front suspension arm 40. It is contemplated that, in some embodiments, the shock absorber 47 could be connected between the rear suspension arm 50 and the slide rails 38.

Left and right torsion springs 20 (FIGS. 1, 2) are provided in order to push the slide rails 38 away from the tunnel 18, and to maintain shock absorbers 42, 47 substantially extended when no substantial loads are applied thereon. The left and right torsion springs 20 are disposed around the left and right shaft portions of the upper end 52 of the rear suspension arm 50 to the tunnel 18. It is contemplated that only one torsion spring could be used.

Figure 7A:
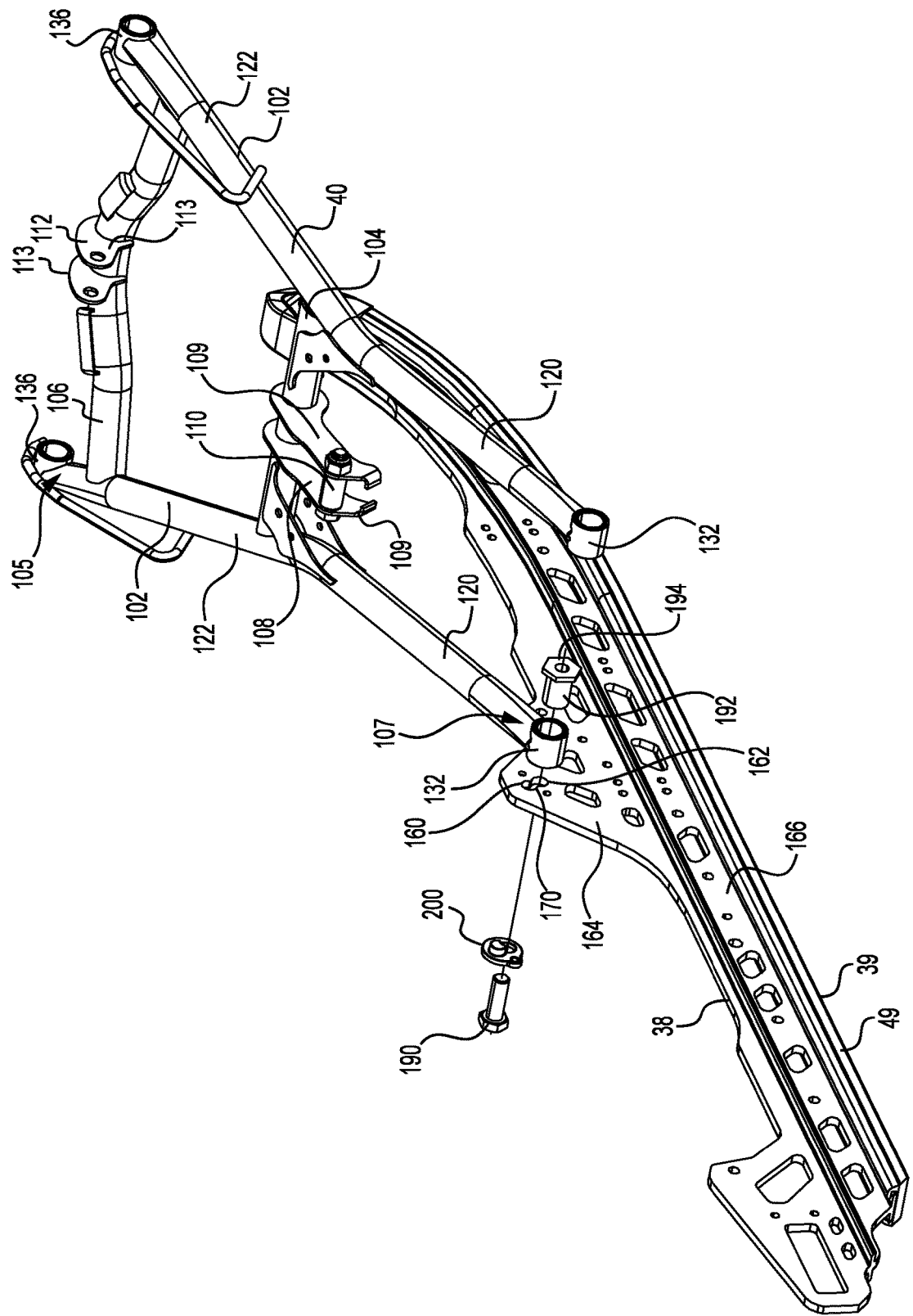
FIG. 7A is a perspective view, taken from a top, rear, right side, of an exploded configuration of the left slide rail and the front suspension arm of the rear suspension assembly of FIG. 3, with the lower end of the front suspension arm in the lower position.
Figure 7B:
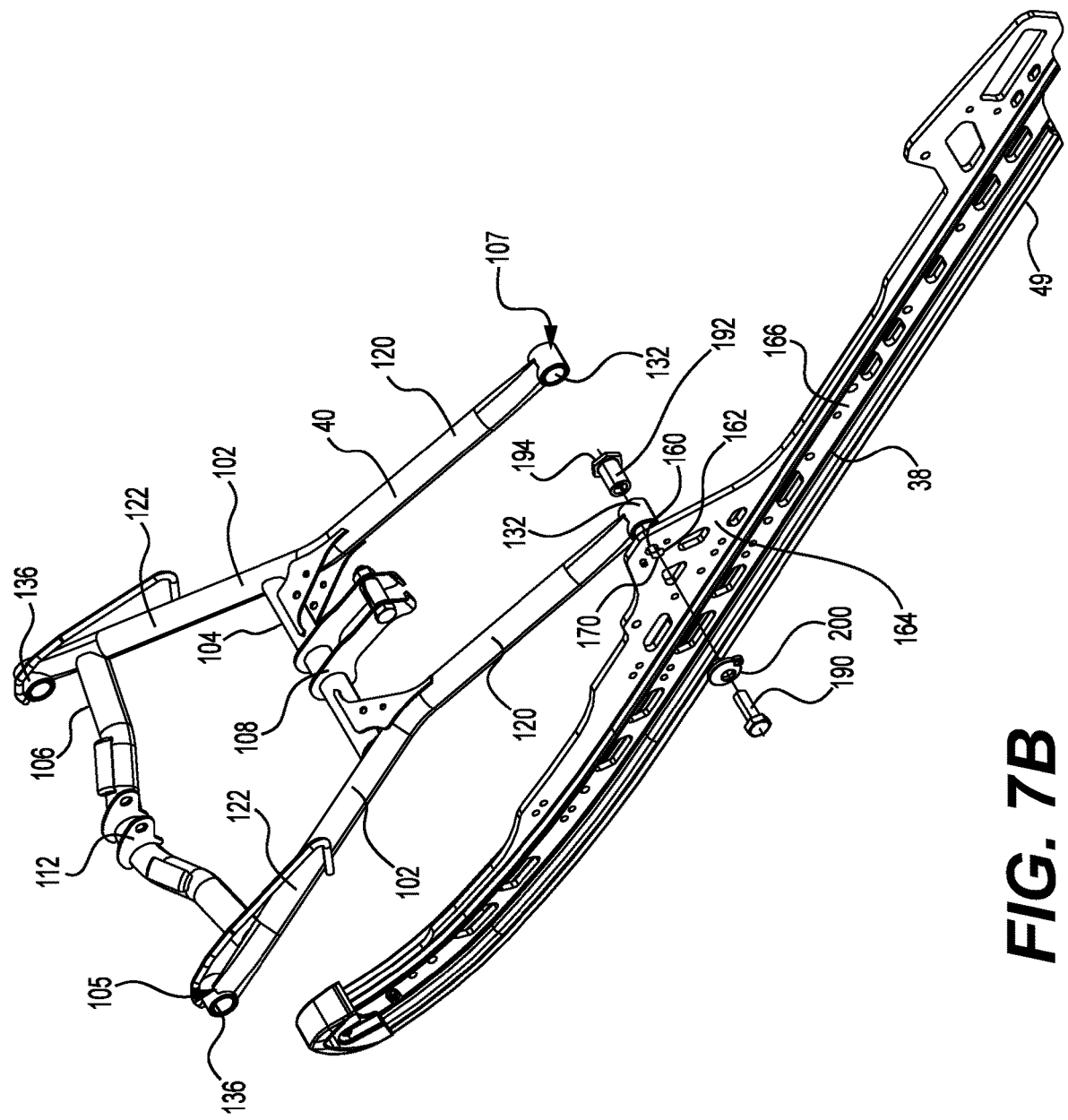
FIG. 7B is a perspective view, taken from a top, rear, left side, of the exploded configuration of the left slide rail and the front suspension arm of FIG. 7A.
Figure 7C:
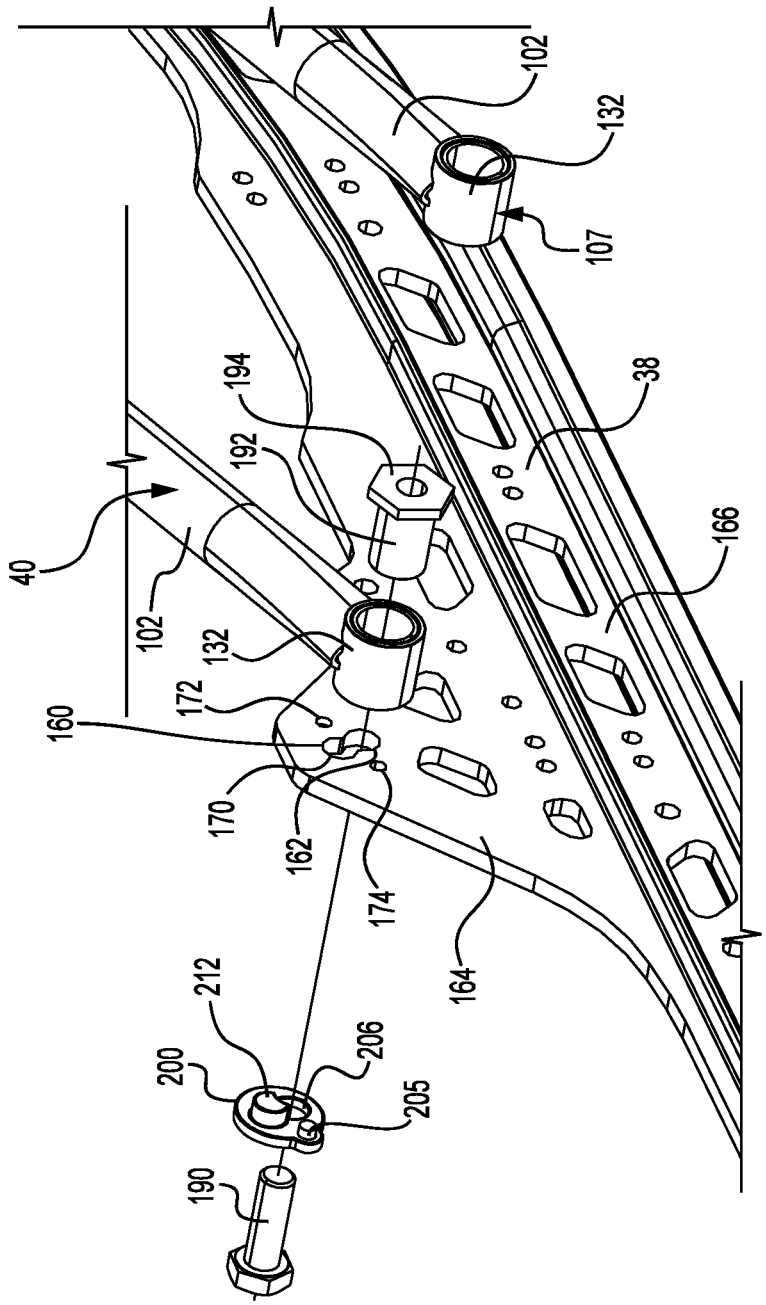
FIG. 7C is a detailed view of part of the exploded configuration of the left slide rail and the front suspension of FIG. 7A.

With reference to FIGS. 1 and 2, an upper end 105 of the front suspension arm 40 is pivotally connected to the tunnel 18 while a lower end 107 of the front suspension arm 40 is pivotably connected to the slide rails 38, as will be described in greater detail below. As shown in FIGS. 7A and 7B, the front suspension arm 40 has left and right members 102 interconnected near the upper end 105 by an upper bar 106, and near a midpoint of the left and right members 102 by a middle bar 104. The left and right members 102 are parallel to one another along a lower portion 120 thereof and diverge away from one another at an upper portion 122 thereof. Notably, in this embodiment, the left and right members 102 are a mirror image of one another about a longitudinal centerplane (not shown) extending through the center of the snowmobile 10.

The middle bar 104 has a shock absorber mounting bracket 108 for mounting the lower end of the rear shock absorber 47. The shock absorber mounting bracket 108 includes two parallel flanges 109 extending rearwardly. A fastener 110 is provided to mount the lower end of the rear shock absorber 47 to the flanges 109. The upper laterally-extending member 106 also has a shock absorber mounting bracket 112 for mounting the upper end of the front shock absorber 42. The shock absorber mounting bracket 112 includes two parallel flanges 113 defining respective openings for receiving a fastener (not shown) to fasten the upper end of the front shock absorber 42 to the shock absorber mounting bracket 112.

The front shock absorber 42 extends rearwardly and downwardly from the bracket 112 to the slide rails 38. Specifically, the shock absorber 42 is pivotably connected to the upper bar 106 via the shock absorber mounting bracket 112. The shock absorber 42 is surrounded by a coil spring 43 although it is contemplated that the coil spring 43 could be omitted in some implementations. In some embodiments, the shock absorber 42 may have selectively variable damping.

The pivoting of the suspension arms 40, 50 changes the relative angle and vertical separation between the slide rails 38 and the tunnel 18 to enable bump absorption as the snowmobile 10 travels over uneven or rough terrain. In the configuration of the arms 40, 50, rocker arms 36 and shock absorbers 42, 47 described above, the rear suspension assembly 32 has the kinematic properties of a five-bar mechanism, generally referred to as an uncoupled rear suspension assembly. The movement of the front and rear portions of the slide rails 38 is generally uncoupled, such that the front suspension arm 40 and the front shock absorber 42 can react independently from the rear suspension arm 50 and the rear shock absorber 47. Movement of the front portions of the slide rails 38 relative to the tunnel 18 causes the front suspension arm 40 to rotate relative to the tunnel 18 (but not necessarily the rear suspension arm 50). Likewise, movement of the rear portions of the slide rails 38 relative to the tunnel 18 causes the rear suspension arm 50 and the rocker arms 36 to rotate relative to the tunnel 18. This uncoupled motion allows the slide rails 38, and the drive track 30, to pass up and over smaller obstacles without needing to compress the whole rear suspension assembly 32.

When the snowmobile 10 encounters a more substantial obstacle, however, it may be desirable to have all of the rear suspension assembly 32 absorb the disturbance. This is achieved by coupling the otherwise independent front and rear suspension arms 40, 50 and their accompanying shock absorbers 42, 47. When coupled, the slide rails 38 maintain substantially the same orientation relative to the tunnel 18 while riding over the bump. In the coupled configuration, the suspension assembly 100 has the kinematic properties of a four-bar mechanism.

With reference to FIGS. 5 and 6, the coupled configuration of the rear suspension assembly 32 is accomplished through the use of one or more coupling blocks 92 connected to the rear suspension arm 50 and the rocker arms 36 in cooperation with one or more corresponding rear stoppers 94 connected to one or both of the slide rails 38. In the present implementation, the snowmobile 10 includes two coupling blocks 92 and two rear stoppers 94. It is contemplated that the snowmobile 10 could include only one coupling block 92 and one rear stopper 94 in some implementations.

In standard operation, the rear suspension arm 50 and the rocker arms 36 rotate generally independently from the front suspension arm 40. When encountering a sufficiently large bump, the rocker arms 36 rotate clockwise (as seen from the left side of the snowmobile 10) until the coupling blocks 92 abut the rear stoppers 94. The rear stoppers 94 impede further clockwise movement of the rocker arms 36, thus eliminating one degree of freedom from the rear suspension assembly 32, thereby converting the five-bar mechanism to the four-bar mechanism. The four-bar mechanism thus couples movement of the front and rear suspension arms 40, 50.

Further details for coupling arrangements in suspension assemblies similar to the coupling blocks 92 and the rear stoppers 94 can be found in U.S. Pat. No. 6,206,124, issued Mar. 27, 2001, the entirety of which is incorporated herein by reference.

There are various ways to adjust the rear suspension assembly 32 and thereby modify the dynamic behavior of the snowmobile 10 and/or of the rear suspension assembly 32. For instance, if the shock absorbers 42, 47 have variable damping, their damping characteristics can be adjusted to modify the response of the rear suspension assembly 32. Notably, the shock absorbers 42, 47 could be made to have stiffer or softer damping characteristics. As another example, by altering the interaction between the coupling blocks 92 and the rear stoppers 94, the dynamic behavior of the rear suspension assembly 32 can be modified as the rear suspension assembly 32 can become "coupled" at different angles of rotation of the rocker arms 36. In the present embodiment, this is achieved by rotating the coupling blocks 92.

However, these adjustments alter various aspects of the dynamic behavior of the rear suspension assembly 32 at the same time. In other words, these adjustments of the rear suspension assembly 32 are not likely to alter a specific aspect of the dynamic behavior of the rear suspension assembly 32 in isolation.

In accordance with the present technology, the front suspension arm 40 can be adjusted to alter one particular aspect of the dynamic behavior of the snowmobile 10 while generally minimizing its effect on other aspects of the dynamic behavior of the snowmobile 10. More particularly, as will be described in detail below, a weight transfer of the snowmobile 10 is modified by adjusting a position of the front suspension arm 40 of the rear suspension assembly 32.

Weight transfer in the snowmobile 10 generally occurs during acceleration thereof, whereby the weight of the snowmobile 10 is transferred toward its rear end to the rear suspension assembly 32. In parallel, the weight supported by the snowmobile's skis 70 is reduced as it is transferred toward the rear suspension assembly. The weight transferred toward the rear suspension assembly 32 causes the drive track 30 to gain traction on the ground which tends to increase the forward acceleration of the snowmobile 10 for any given amount of acceleration requested by the driver through a throttle operator (e.g., a lever at the handlebar). While users may be content with the amount of forward acceleration provided by a default configuration of the rear suspension assembly 32 and the drive track 30, in some cases the drive track 30 may be losing traction with the ground (e.g., the drive track could be spinning) and therefore users may desire additional forward acceleration and thus could benefit from an increased weight transfer of the snowmobile 10.

Conventional snowmobiles suspensions can be adjusted to alter the weight transfer, namely by adjusting the coupling blocks of the rear suspension assembly mentioned above. However, as discussed above with respect to the snowmobile 10, adjusting the coupling blocks also affects when the rear suspension assembly is coupled or uncoupled, thus also significantly affecting other aspects of the dynamic behavior of the snowmobile such as rider comfort.

In order to adjust the weight transfer of the snowmobile 10 via the rear suspension assembly 32 without affecting the coupled configuration of the rear suspension assembly 32, the position of the lower end 107 of the front suspension arm 40 can be changed between a plurality of positions, namely including an upper position UP and a lower position LP, illustrated in FIGS. 3 and 4 respectively. In other words, the lower end 107 of the front suspension arm 40 is selectively connected to the slide rails 38 between the upper and lower positions UP, LP to affect the weight transfer of the snowmobile 10. It is contemplated that the position of the lower end 107 of the front suspension arm 40 could be changed between more than two positions in other embodiments.

Figure 10:
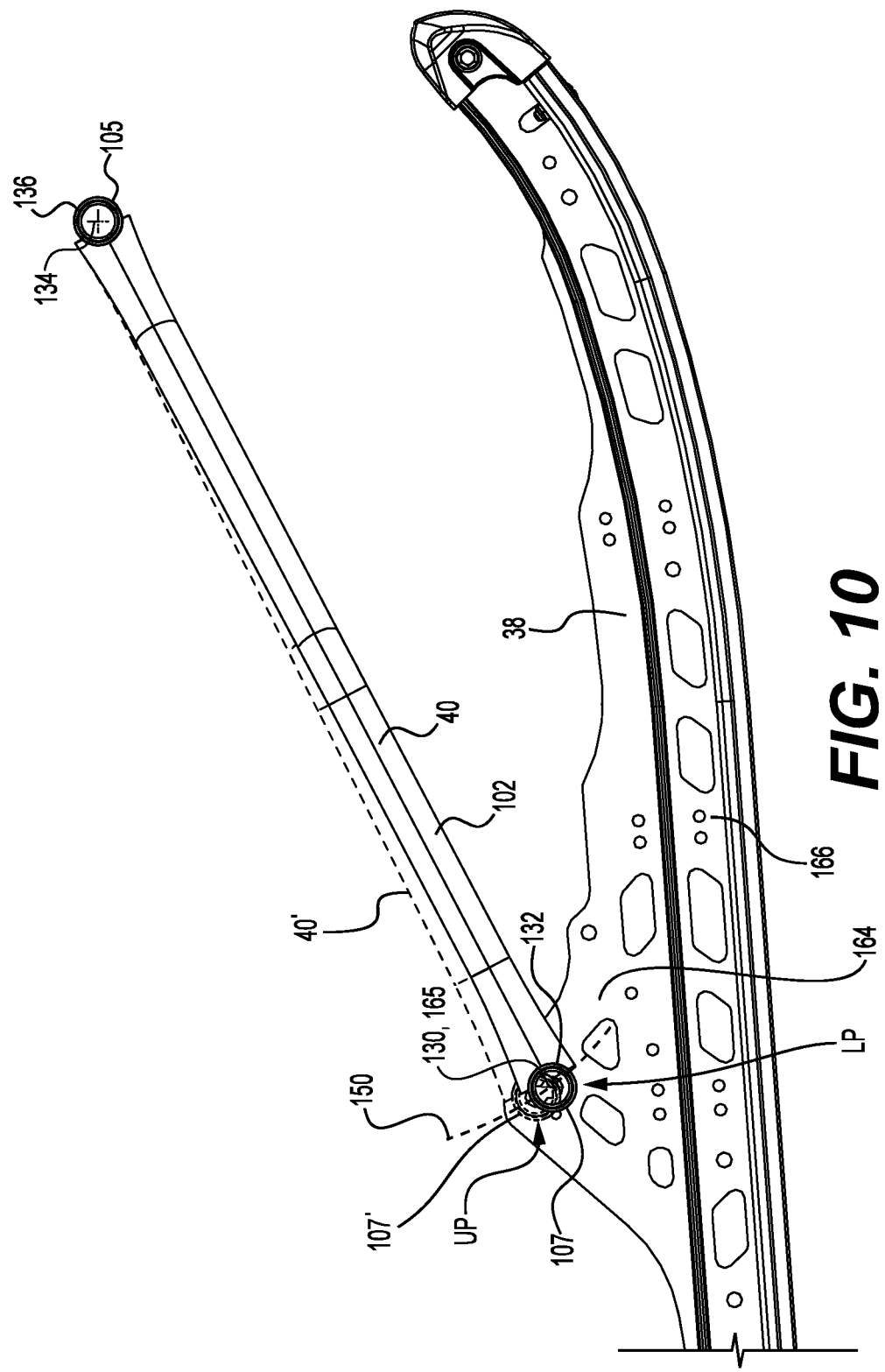
FIG. 10 is a right side elevation view of part of the left slide rail and the front suspension arm of the rear suspension assembly of FIG. 3, with the lower end of the front suspension arm in the lower position.

With reference to FIGS. 3, 4 and 10, in the upper position UP, the lower end 107 of the front suspension arm 40 is vertically higher than when the lower end 107 is in the lower position LP. For instance, a lower pivot axis 130 of the lower end 107 about which the lower end 107 pivots relative to the slide rails 38, defined by lower end mounts 132 of the respective left and right members 102 of the front suspension arm 40, is vertically higher in the upper position UP of the lower end 107 than in the lower position LP of the lower end 107. Moreover, the lower pivot axis 130 of the lower end 107 is longitudinally displaced when the lower end 107 is moved from the upper position UP to the lower position LP and vice-versa. In particular, the lower pivot axis 130 of the lower end 107 in the upper position UP is rearward of the lower pivot axis 130 of the lower end 107 in the lower position LP.

More particularly, both in the upper position UP and the lower position LP, the lower pivot axis 130 of the lower end 107 defines a point about a common arc 150 (FIG. 4) which is centered about the upper end 105 of the front suspension arm 40. Specifically, the arc 150 is centered about an upper pivot axis 134 defined by a pivot which is defined in part by upper end mounts 136 of the respective left and right members 102 of the front suspension arm 40 (corresponding to the upper end 105). In other words, the lower end 107, and the lower pivot axis 130 thereof, is positioned along the arc 150 when the lower end 107 is in the upper position UP and when the lower end 107 is in the lower position LP.

In order to make the change of position of the lower end 107 more readily apparent to the reader, FIG. 10 shows the front suspension arm 40 when the lower end 107 is in the lower position LP in solid lines and when the lower end 107 is in the upper position UP in dashed lines. The front suspension arm having its lower end in the upper position UP has been denoted as the front suspension arm 40' and its lower end as 107'.

As will be understood, moving the lower end 107 of the front suspension arm 40 from the upper position UP to the lower position LP and vice-versa changes the disposition of the front suspension arm 40 relative to the slide rails 38. Notably, an angle α formed between the front suspension arm 40 and the slide rails 38 is different when the lower end 107 is in the upper position UP and when the lower end 107 is in the lower position LP. In particular, the angle α is greater when the lower end 107 is in the lower position LP than when the lower end 107 is in the upper position UP. As can be seen in FIGS. 3 and 4, in this example, the angle α is measured between the lower straight surfaces 39 of the slide rails 38 and the left and right members 102 of the front suspension arm 40. In particular, the angle α is measured between the lower straight surfaces 39 of the slide rails 38 and a straight line 75 extending through the lower and upper pivot axes 130, 134 defined by the lower and upper end mounts 132 of the left and right members 102 of the front suspension arm 40. However, as will be readily apparent to the reader, other suitable reference points on the slide rails 38 and the front suspension arm 40 can be used to measure the angle α.

The change in the angle α as the lower end 107 is moved from the upper position UP to the lower position LP and vice-versa changes the weight transfer of the snowmobile 10. Notably, when the angle α is made greater, a greater amount of weight is transferred to the rear suspension assembly 32 when the snowmobile 10 accelerates. As such, a greater amount of weight is transferred to the rear suspension assembly 32 when the lower end 107 is in the lower position LP than when the lower end 107 is in the upper position UP.

Furthermore, while the lower end 107 is moved vertically between the upper and lower positions UP, LP, this is not the case for the upper end 105 of the front suspension arm 40. Notably, as can be seen in FIG. 10, the upper end 105 of the front suspension arm 40 is in generally the same vertical position when the lower end 107 is in the upper position UP and when the lower end 107 is in the lower position LP. For instance, the upper pivot axis 134 remains in generally the same vertical position when the lower end 107 is in the upper position UP and when the lower end 107 is in the lower position LP. This can be helpful to ensure that the snowmobile 100 remains in a same stationary position despite the change of positions of the lower end 107. For instance, a height of the seat 60 off the ground remains the same in the upper and lower positions UP, LP of the lower end 107. This can be best understood by observing the vertical position of the tunnel 18 in the upper and lower positions UP, LP of the lower end 107. Notably, when the snowmobile 10 is under identical conditions, a vertical distance 155 (FIG. 2) between the upper pivot axis 67 and the slide rails 38 is the same when the lower end 107 is in the upper position UP and when the lower end 107 is in the lower position LP. As can be seen in FIG. 2, in this example, the vertical distance 155 is measured between the upper pivot axis 67 and the bottom surfaces 39 of the slide shoes 49 of the slide rails 38.

Figure 8:
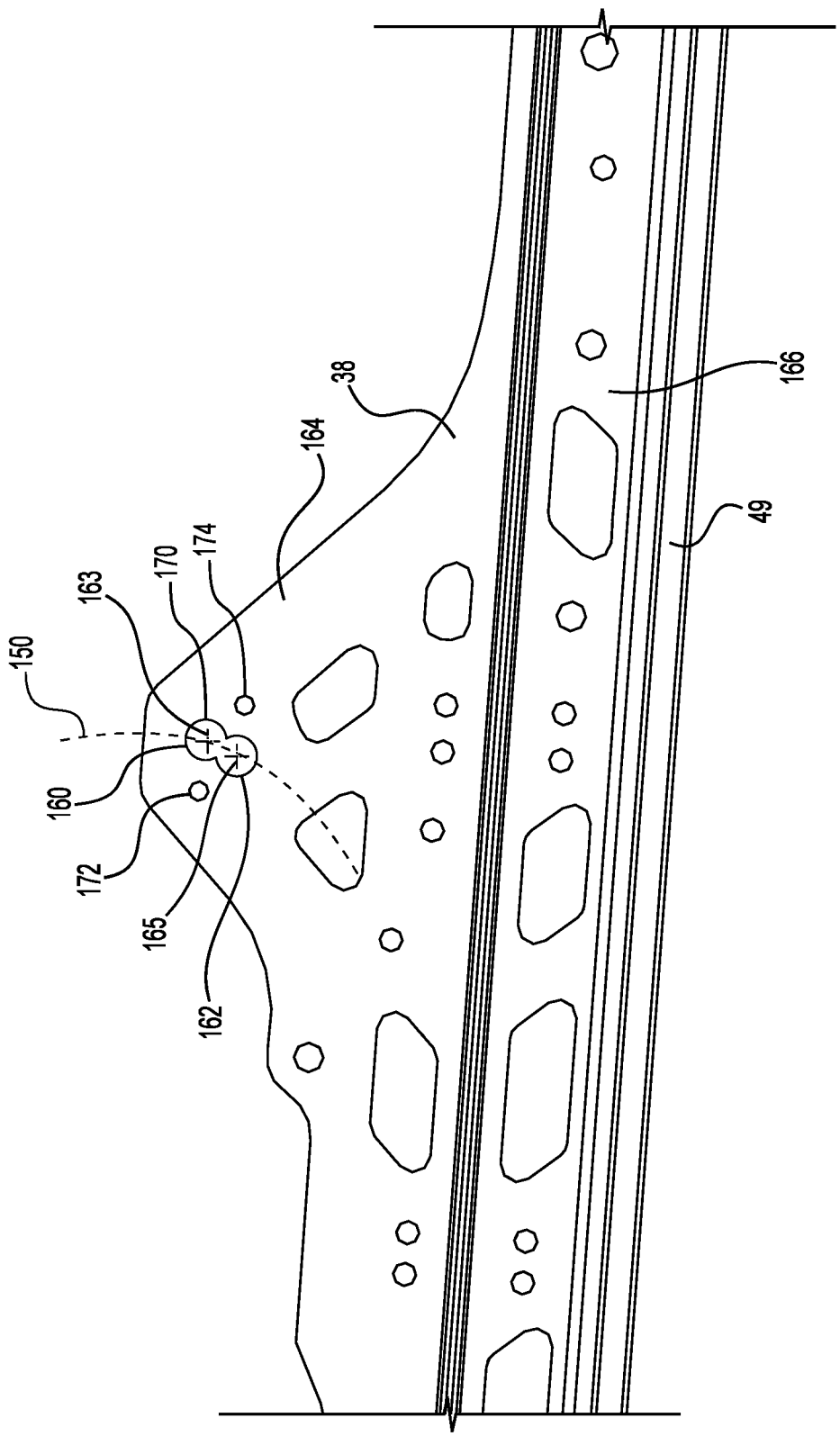
FIG. 8 is a left side elevation view of part of the left slide rail of FIG. 7A.
Figure 9A:
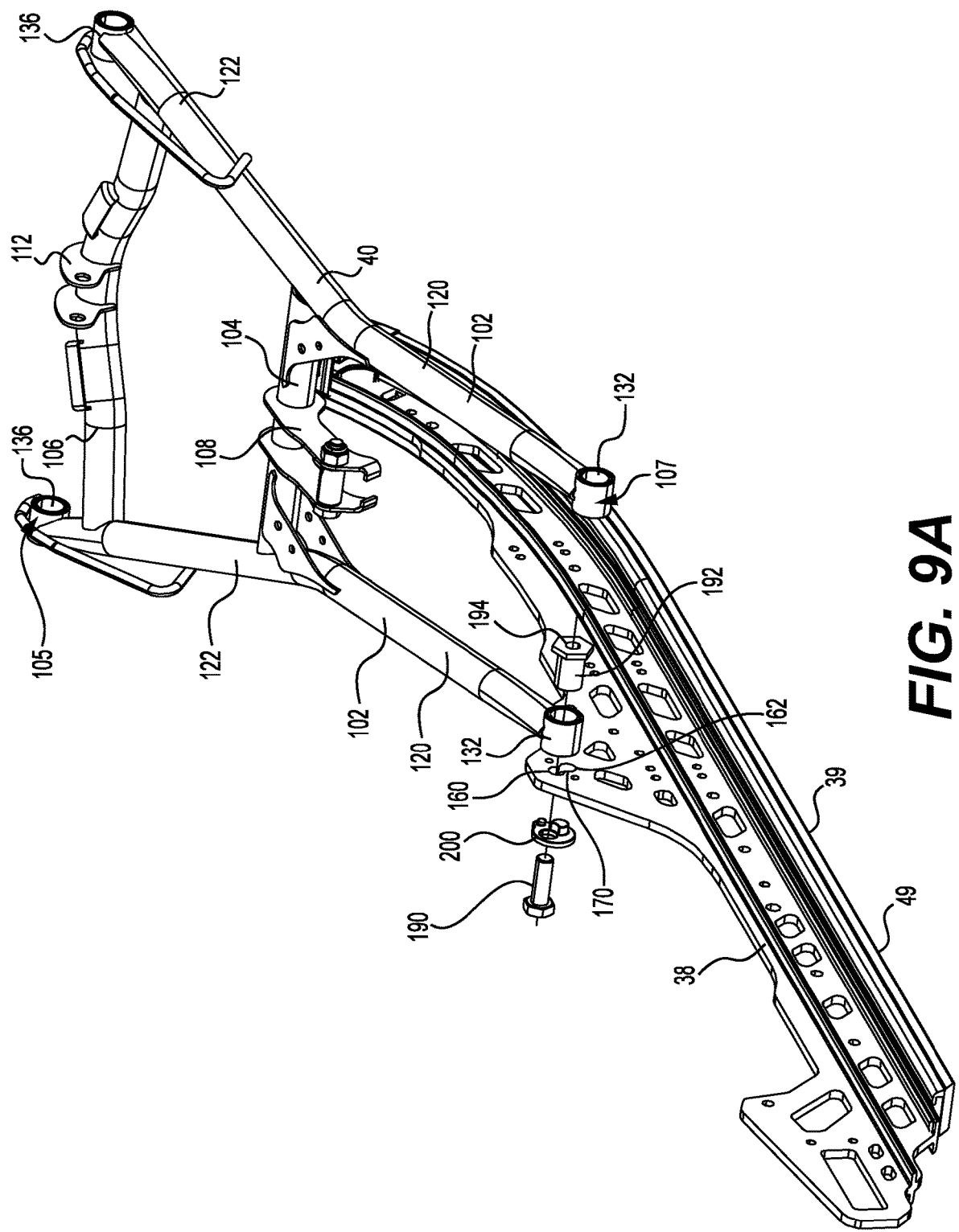
FIG. 9A is a perspective view, taken from a top, rear, right side, of an exploded configuration of the left slide rail and the front suspension arm of the rear suspension assembly of FIG. 3, with the lower end of the front suspension arm in the upper position.
Figure 9B:
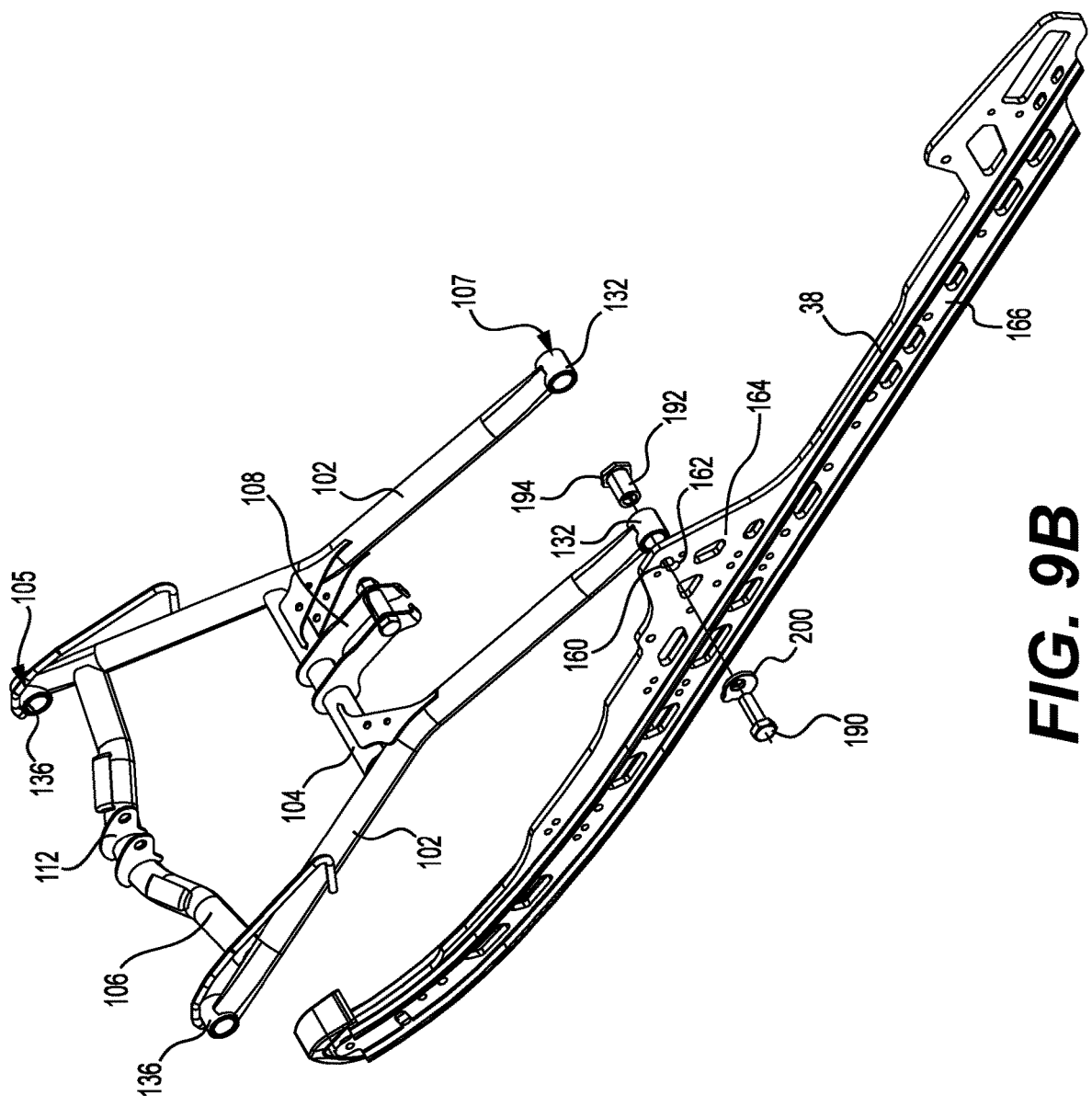
FIG. 9B is a perspective view, taken from a top, rear, left side, of the exploded configuration of the left slide rail and the front suspension arm of FIG. 9A.
Figure 9C:
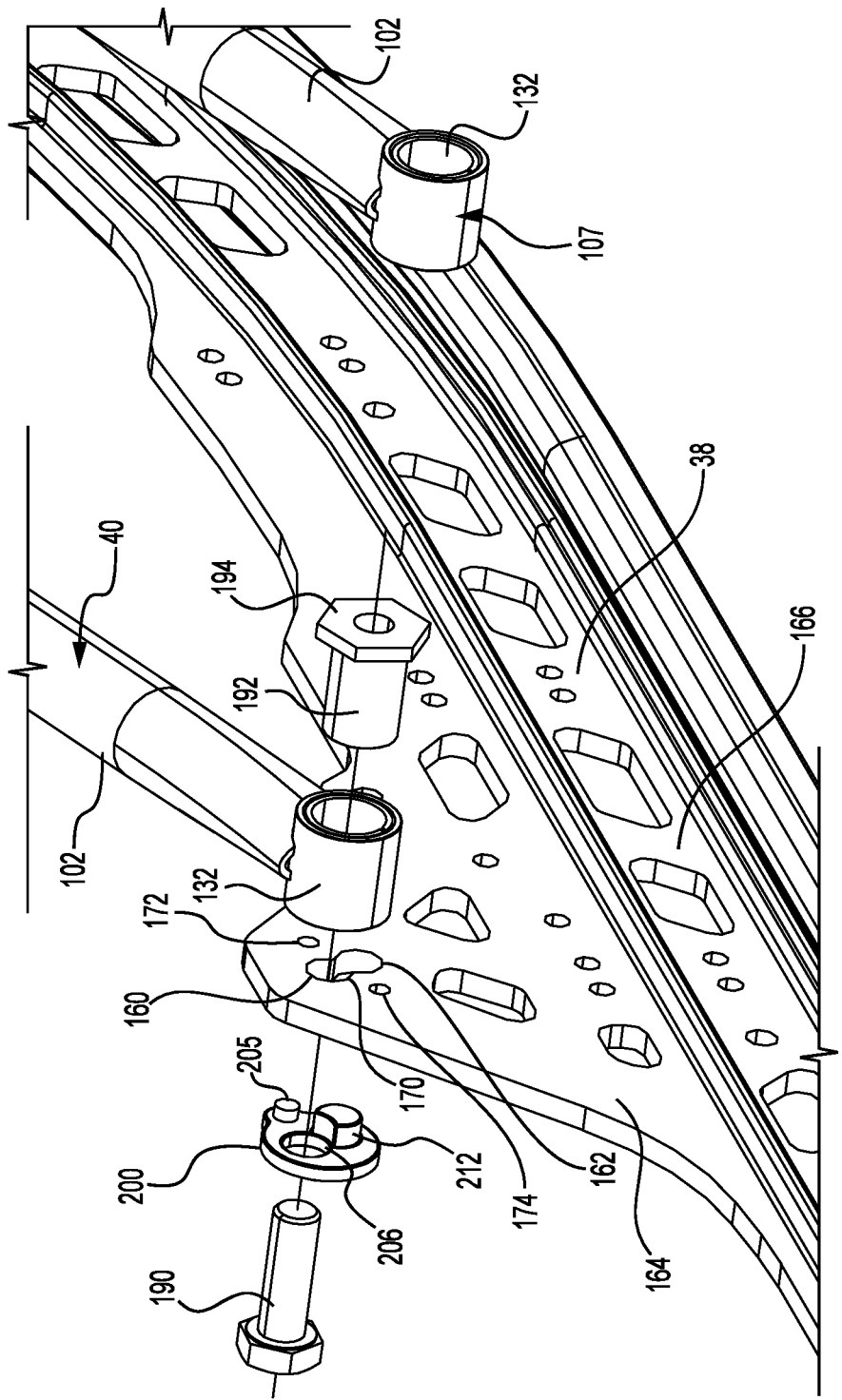
FIG. 9C is a detailed view of part of the exploded configuration of the left slide rail and the front suspension of FIG. 9A.

The configuration of the left slide rail 38 for connecting the front suspension arm 40 thereto will be described in detail with reference to FIG. 8. As will be understood by the reader, the right slide rail 38 is a mirror image of the left slide rail 38 and therefore will not be described in detail herein. As shown in FIG. 8, in order to selectively connect the lower end 107 to the slide rail 38 in the upper position UP and the lower position LP, the slide rail 38 defines an upper opening 160 and a lower opening 162 corresponding to the upper and lower positions UP, LP respectively. In particular, in this embodiment, the upper and lower openings 160, 162 are provided in an upper portion 164 of the slide rail 38, extending upwardly from a lower portion 166 of the slide rail 38 to which one of the respective slide shoes 49 is connected. The upper and lower openings 160, 162 are circular and are centered about respective axes 163, 165 which extend parallel to one another and lie along arc 150, as shown in FIG. 8. More specifically, in this embodiment, the upper and lower openings 160, 162 are in communication with one another so as to form a common aperture 170. Fastening openings 172, 174 are defined by the upper portion 164 of the slide rail 38, adjacent to the aperture 170. Notably, the openings 172, 174 are disposed on opposite sides of the aperture 170. The fastening openings 172, 174 may be omitted in other embodiments.

It is contemplated that, in embodiments in which the position of the lower end 107 of the front suspension arm 40 can be changed between more than two positions, additional openings are provided in the slide rails 38 corresponding to the additional positions.

Figure 14:
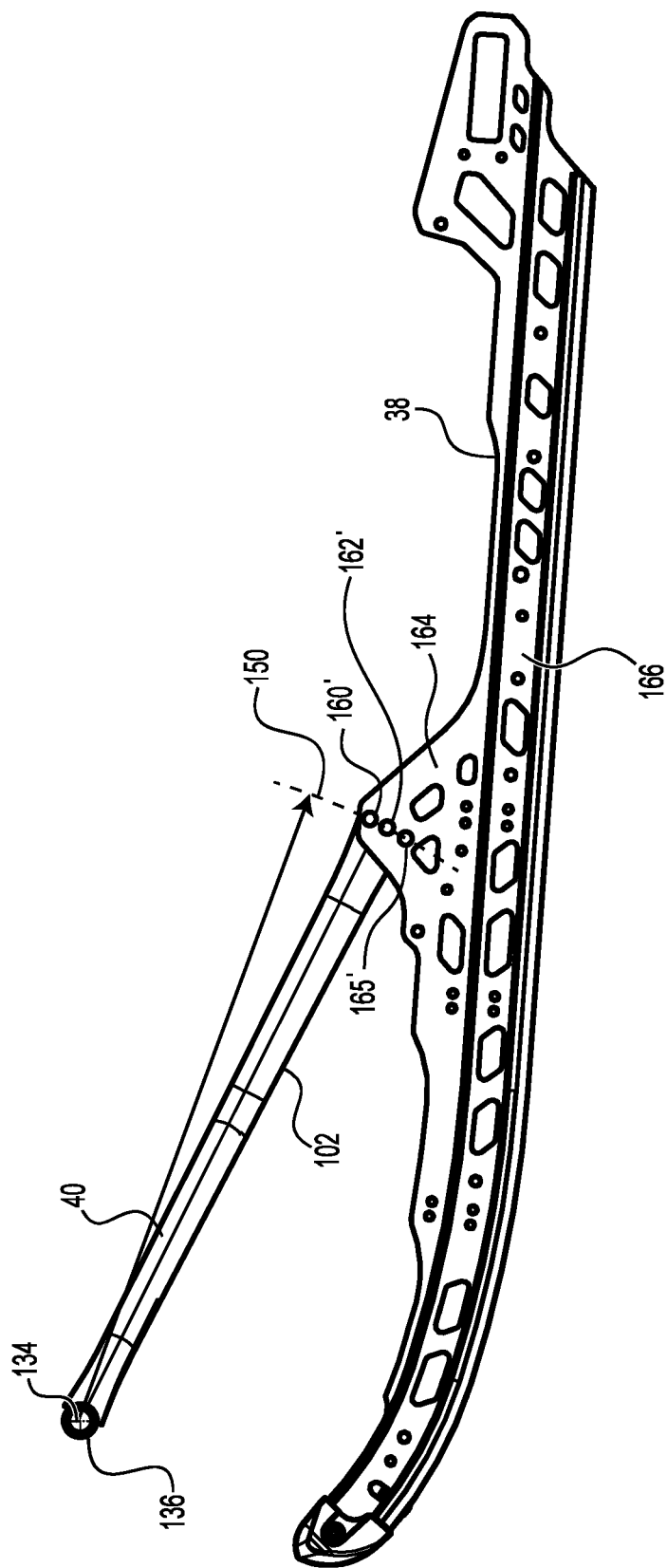
FIG. 14 is a left side elevation view of the left slide rail and the front suspension arm of the rear suspension arm in accordance with another embodiment.

Furthermore, in some embodiments, such as that illustrated in FIG. 14, the upper and lower openings may not be in communication with one another such that material of the slide rail 38 separates the openings 160, 162.

As will be described in greater detail below, when the lower end 107 of the front suspension arm 40 is in the upper position UP, the lower end 107 is connected to the slide rails 38 via the upper openings 160. As such, when the lower end 107 is in the upper position UP, the lower pivot axis 130 defined by the lower end mounts 132 of the front suspension arm 40 is generally coincident with the axes 163 of the upper openings 160, such that the lower end 107 pivots about the axes 163. Conversely, when the lower end 107 is in the lower position LP, the lower end 107 is connected to the slide rails 38 via the lower openings 162. As such, when the lower end 107 is in the lower position LP, the lower pivot axis 130 defined by the lower end mounts 132 of the front suspension arm 40 is generally coincident with the axes 165 of the lower openings 162, such that the lower end 107 pivots about the axes 165.

The lower end 107 of the front suspension arm 40 is thus pivotably connected to the slide rails 38 in one of the upper position UP and the lower position LP via the upper openings 160 or the lower openings 162 in accordance with the desired weight transfer behavior of the snowmobile 10. More specifically, as shown in FIGS. 7A to 7C and 9A to 9C, each lower end mount 132 of the front suspension arm 40, defining the lower end 107, is aligned with the selected one of the upper opening 160 or the lower opening 162 of a corresponding one of the left and right slide rails 38 and connected thereto by a bolt 190 and a threaded bushing 192. In particular, the bolt 190 is inserted through the upper opening 160 or lower opening 162, and threaded into the bushing 192 which is received within the cylindrical lower end mount 132. Bushing 192 further includes a hexagonal-shaped end 194 configured to be held by a tool which will prevent bushing 192 from turning during installation. It is contemplated that threaded bushing 192 could be replaced with a non-threaded bushing and a separate nut that will thread with bolt 190.

Furthermore, in this embodiment, in order to facilitate the connection between the lower end 107 of the front suspension arm 40 and either one of the openings 160, 162 of the slide rails 38, two adjustable members 200 are provided. The adjustable members 200 are configured to prevent the bolts 190 engaging the slide rails 38 from being accidentally disengaged from one of the openings 160, 162 and into another one of the openings 160, 162 since the openings 160, 162 are in communication with one another. As will be described below, each adjustable member 200 is connected to one of the slide rails 38 by engaging one of the upper opening 160 and the lower opening 162 of the corresponding slide rail 38.

Figure 11:
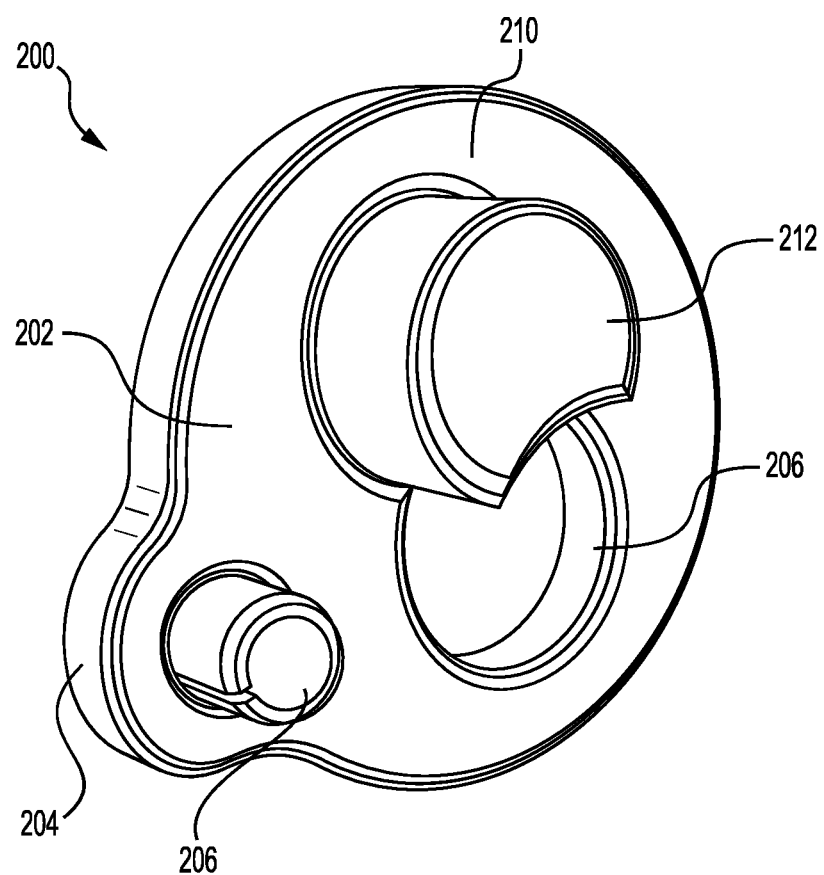
FIG. 11 is a perspective view, taken from a rear, right side, of a left adjustable member of the rear suspension assembly of FIG. 3.
Figure 13:
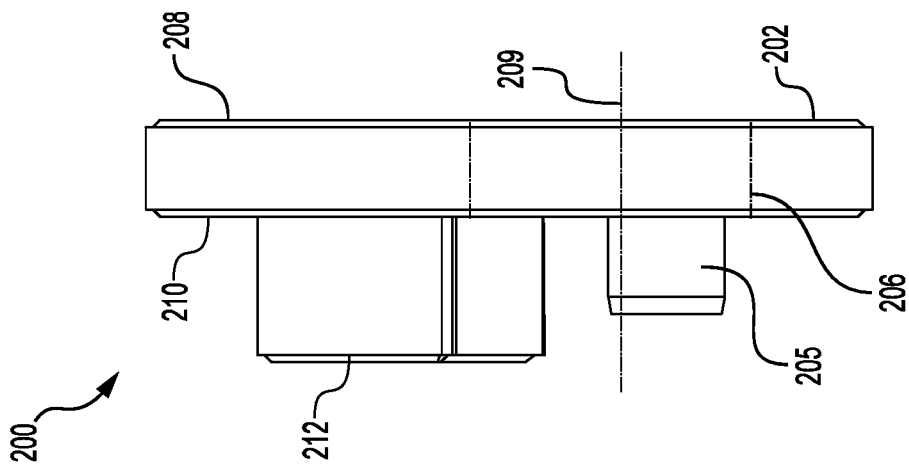
FIG. 13 is a front elevation view of the adjustable member of FIG. 11.
Figure 12:
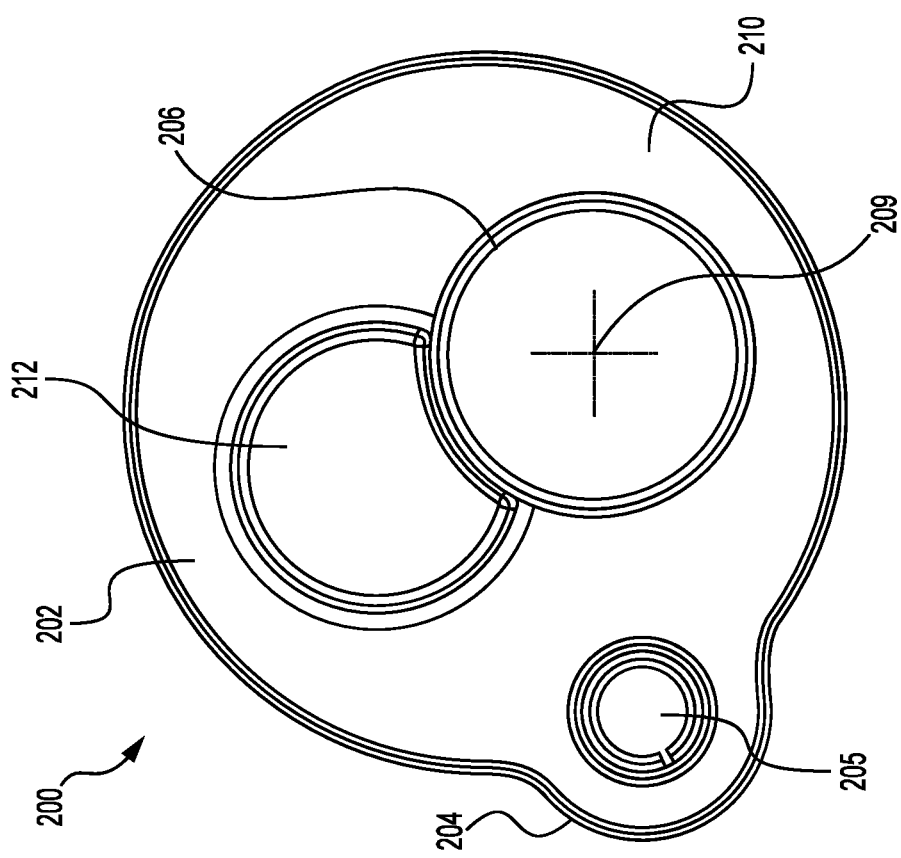
FIG. 12 is a right side elevation view of the adjustable member of FIG. 11.

With reference to FIGS. 11 to 13, each adjustable member 200 has a body portion 202 which, in this embodiment, is generally circular and a boss 204 extending from the circular periphery of the body portion 202. The boss 204 defines a protrusion 205. The body portion 202 defines a circular opening 206 which extends from an outer face 208 to an inner face 210 of the body portion 202. The opening 206 is centered about an axis 209 (FIGS. 12, 13). A protrusion 212 extends from the inner face 210 of the body portion 202. The protrusion 212 is sized and shaped to fit into either one of the upper openings 160 and the lower openings 162 of the slide rails 38. Notably, the protrusion 212 is generally cylindrical but has an arcuate cut at a portion thereof adjacent to the opening 206 which corresponds to a portion of the perimeter of the circular opening 206. The protrusion 212 defines a diameter suitable for being inserted into the upper or lower openings 160, 162. As can be seen, the protrusion 212 and the opening 206 are eccentric relative to the generally circular shape of the body portion 202. Notably, the axis 209 of the opening 206 is offset from a center of the body portion 202. Similarly, a center of the generally cylindrical protrusion 212 is offset from the center of the body portion 202.

Each adjustable member 200 can be selectively connected to the corresponding slide rail 38 in two distinct orientations. Notably, in one orientation illustrated in FIGS. 7A to 7C, the protrusion 212 of the adjustable member 200 is inserted into the upper opening 160 of the slide rail 38 while the opening 206 of the adjustable member 200 is aligned with the lower opening 162 such that the axis 209 of the opening 206 is coincident with the axis 165 of the lower opening 162. The bolt 190 is then inserted into the openings 206, 162 and into the lower mount end 132 of the corresponding left or right member 102 so as to connect the lower end 107 of the front suspension arm 40 to the slide rail 38. In an another orientation illustrated in FIGS. 9A to 9C, the protrusion 212 of the adjustable member 200 is inserted into the lower opening 162 of the slide rail 38 while the opening 206 of the adjustable member 200 is aligned with the upper opening 160 such that the axis 209 of the opening 206 is coincident with the axis 163 of the upper opening 160. The bolt 190 is then inserted into the openings 206, 160 and into the lower mount end 132 of the corresponding left or right member 102 so as to connect the lower end 107 of the front suspension arm 40 to the slide rail 38.

While the adjustable members 200 are provided on the outer side of the slide rails 38 in this embodiment, it is contemplated that the adjustable members 38 could be provided on the inner side of the slide rails 38 in other embodiments.

In order to hold the adjustable members 200 in place on the slide rails 38 prior to connecting the lower end 107 of the front suspension arm 40 to the slide rails 38, the protrusion 205 of each adjustable member 200 is inserted into one of the openings 172, 174 (FIG. 8) of the corresponding slide rail 38. Notably, when the lower end 107 of the front suspension 40 is in the upper position UP, the protrusion 205 of the adjustable member 200 is aligned with the opening 172 (which is vertically higher than the opening 174) and inserted therethrough. Conversely, when the lower end 107 of the front suspension 40 is in the lower position LP, the opening 205 of the adjustable member 200 is aligned with the opening 174 and inserted therethrough.

Therefore, as will be understood, a user wishing to modify the weight transfer of the snowmobile 10 without significantly affecting other aspects of the behavior of the snowmobile 10 can do so by setting the lower end 107 of the front suspension arm 40 to the upper position UP or the lower position LP. In order to make this adjustment, the user disconnects the lower end 107 from the slide rails 38 by removing the bolts 190 from the nuts 194 to free the lower end mounts 132 of the front suspension arm 40. Then, in this embodiment, the adjustable members 200 are disengaged from the slide rails 38 and their orientation is inversed so as to align the protrusions 212 thereof with the other one of the openings 160, 162 of the slide rails 38. Both adjustable members 200 are thus placed in the same (mirror image) orientation and inserted into the slide rails 38 again such that the openings 206 of the adjustable members 200 are aligned with the opening 160, 162 via which the lower end 107 is to be connected to the slide rails 38. The lower end 107 of the front suspension arm 40 is then reconnected to the slide rails 38 by inserting the bolts 190 into the adjustable members 200, through the bushings 192 and the lower end mounts 132, and received securely by the nuts 194.

It is contemplated that, in some embodiments, a single adjustable member extending between both slide rails 38 could be provided instead of two separate adjustable members 200. For example, in embodiments in which the lower end mounts 132 of the front suspension arm 40 were connected by a cross-bar, the single adjustable member could extend along the cross-bar.

Moreover, in some embodiments, the adjustable members 200 may be omitted altogether. For example, in the embodiment of FIG. 14, each slide rail 38 defines openings 160', 162',165' (in place of the openings 160, 162) which do not communicate with one another but are instead separated by material of the slide rails 38. As such, the material of the slide rails 38 would prevent the bolts 190 from being accidentally pushed into an adjacent opening and therefore the adjustable members 200 could be omitted. As can be seen in FIG. 14, three openings 160',162',165' are provided instead of two, and the axes of each of the openings 160',162',165' are disposed along the arc 150. Therefore, the lower end 107 of the front suspension arm 40 can be positioned in three separate positions, including an upper position, an intermediate position and a lower position corresponding to the openings 160',162',165' respectively.

In accordance with an alternative embodiment, as shown in FIG. 15, the openings 160',162',165' may not be disposed along the arc 150. Notably, in FIG. 15, the axes of the openings 160',162',165' are vertically spaced but are not disposed along a common arc. For instance, a vertical distance A1 between the axis of the opening 160' and the bottom surface 39 of the slide shoe 49 of the corresponding slide rail 38 is greater than a vertical distance A2 between the axis of the opening 162' and the bottom surface 39 of the slide shoe 49 of the corresponding slide rail 38. Similarly, the vertical distance A2 is greater than a vertical distance A3 between the axis of the opening 165' and the bottom surface 39 of the slide shoe 49 of the corresponding slide rail 38. However, in this embodiment, the openings 160',162',165' are not longitudinally aligned such that a straight line extending through the axes of the openings 160' and 165' does not extend through the axis of the opening 162'. It is contemplated that, in other embodiments, the openings 160',162',165' could be longitudinally aligned with one another.

Modifications and improvements to the above-described embodiments of the present may become apparent to those skilled in the art. The foregoing description is intended to be exemplary rather than limiting. The scope of the present is therefore intended to be limited solely by the scope of the appended claims.

What is claimed is:

1. A snowmobile comprising:
a frame including a tunnel;
a motor supported by the frame;
a front suspension assembly connected to the frame;
at least one ski connected to the front suspension assembly;
a drive track operatively connected to the motor for propelling the snowmobile on the ground; and
a rear suspension assembly, comprising:
at least one slide rail extending generally longitudinally, the at least one slide rail having a bottom surface, the at least one slide rail defining a first opening and a second opening in communication with one another so as to form a common aperture, the first opening being centered about a first axis, the second opening being centered about a second axis extending parallel to the first axis, the first and second openings being positioned and dimensioned such that a circular shape of the first opening partly overlaps a circular shape of the second opening;
a plurality of idler wheels connected to the at least one slide rail, the drive track being tensioned about the plurality of idler wheels;
a front suspension arm having a first upper end and a first lower end, the first upper end being connected to the tunnel, the first lower end being selectively connected to the at least one slide rail, the first lower end being connectable to the at least one slide rail at a first position or at a second position, the first position of the first lower end being vertically higher from the bottom surface of the at least one slide rail than the second position of the first lower end,
in the first position, the first lower end being connected to the at least one slide rail via the first opening and pivoting about the first axis,
in the second position, the first lower end being connected to the at least one slide rail via the second opening and pivoting about the second axis; and
a rear suspension arm having a second upper end and a second lower end, the second upper end being connected to the tunnel.

2. The snowmobile of claim 1, wherein:
in the first position, the first lower end defines a first point about an arc centered about the first upper end; and
in the second position, the first lower end defines a second point about the arc.

3. The snowmobile of claim 1, wherein the first upper end is in a generally same vertical position when the first lower end is in the first position and when the first lower end is in the second position.

4. The snowmobile of claim 1, wherein:
in the first position of the first lower end, the front suspension arm forms a first angle with the at least one slide rail;
in the second position of the first lower end, the front suspension arm forms a second angle with the at least one slide rail; and
the second angle is greater than the first angle.

5. The snowmobile of claim 2, wherein the arc is centered about a pivot defined by the first upper end.

6. The snowmobile of claim 1, wherein:
the second upper end of the rear suspension arm is pivotable relative to the tunnel about a second upper end axis; and
when under identical conditions, a vertical distance between the second upper end axis and the at least one slide rail is the same when the first lower end is in the first position and when the first lower end is in the second position.

7. The snowmobile of claim 1, further comprising at least one adjustable member selectively connected to the at least one slide rail in one of a first orientation and a second orientation, each adjustable member of the at least one adjustable member comprising:
a body portion defining a body opening;
a protrusion extending from the body portion, the protrusion being sized and shaped to fit into either one of the first opening and the second opening of the at least one slide rail,
wherein:
in the first orientation, the protrusion of the at least one adjustable member is inserted in the second opening of the at least one slide rail while the body opening is aligned with the first opening, the first lower end of the front suspension arm being in the first position, a fastener extending through the body opening and the first lower end to connect the first lower end to the at least one slide rail; and
in the second orientation, the protrusion of the at least one adjustable member is inserted in the first opening of the at least one slide rail while the body opening is aligned with the second opening, the first lower end of the front suspension arm being in the second position, the fastener extending through the body opening and the first lower end to connect the first lower end to the at least one slide rail.

8. The snowmobile of claim 7, wherein:
the body portion is generally circular; and
the protrusion and the body opening are eccentric relative to the generally circular shape of the body portion.

9. The snowmobile of claim 7, wherein the at least one slide rail includes a first slide rail and a second slide rail.

10. The snowmobile of claim 9, wherein:
the at least one adjustable member includes a first adjustable member and a second adjustable member;
the first adjustable member is selectively connected to the first slide rail in one of the first orientation and the second orientation;
the second adjustable member is selectively connected to the second slide rail in one of the first orientation and the second orientation; and
the first and second adjustable members are in the same one of the first orientation and the second orientation.

11. The snowmobile of claim 1, wherein the rear suspension assembly further comprises:
at least one rocker arm connected between the at least one slide rail and the rear suspension arm, the second lower end of the rear suspension arm being connected to the at least one rocker arm.

12. The snowmobile of claim 11, wherein the rear suspension assembly further comprises:
at least one coupling block connected to the at least one slide rail, the at least one coupling block being configured to limit displacement of the at least one rocker arm.

13. The snowmobile of claim 1, wherein the rear suspension assembly further comprises:
a front shock absorber connected between the front suspension arm and the at least one slide rail; and
a rear shock absorber connected between the front suspension arm and the rear suspension arm.

14. The snowmobile of claim 1, wherein the first lower end is connected to each slide rail of the at least one slide rail via a bushing and a bolt extending through the slide rail and into the bushing.

15. The snowmobile of claim 1, wherein a sum of the radii of the first and second openings is greater than a distance between the first axis and the second axis.

16. A snowmobile comprising:
a frame including a tunnel;
a motor supported by the frame;
a front suspension assembly connected to the frame;
at least one ski connected to the front suspension assembly;
a drive track operatively connected to the motor for propelling the snowmobile on the ground;
a rear suspension assembly, comprising:
at least one slide rail extending generally longitudinally, the at least one slide rail having a bottom surface, the at least one slide rail defines a first opening and a second opening, the first opening being centered about a first axis, the second opening being centered about a second axis extending parallel to the first axis;
a plurality of idler wheels connected to the at least one slide rail, the drive track being tensioned about the plurality of idler wheels;
a front suspension arm having a first upper end and a first lower end, the first upper end being connected to the tunnel, the first lower end being selectively connected to the at least one slide rail, the first lower end being connectable to the at least one slide rail at a first position or at a second position, the first position of the first lower end being vertically higher from the bottom surface of the at least one slide rail than the second position of the first lower end;
the first lower end being connected to the at least one slide rail via the first opening and pivoting about the first axis when the first lower end of the front suspension arm is in the first position; and
the first lower end being connected to the at least one slide rail via the second opening and pivoting about the second axis when the first lower end of the front suspension arm is in the second position; and
a rear suspension arm having a second upper end and a second lower end, the second upper end being connected to the tunnel; and
at least one adjustable member selectively connected to the at least one slide rail in one of a first orientation and a second orientation, each adjustable member of the at least one adjustable member comprising:
a body portion defining a body opening; and
a protrusion extending from the body portion, the protrusion being sized and shaped to fit into either one of the first opening and the second opening of the at least one slide rail,
wherein:
in the first orientation, the protrusion of the at least one adjustable member is inserted in the second opening of the at least one slide rail while the body opening is aligned with the first opening, the first lower end of the front suspension arm being in the first position, a fastener extending through the body opening and the first lower end to connect the first lower end to the at least one slide rail; and
in the second orientation, the protrusion of the at least one adjustable member is inserted in the first opening of the at least one slide rail while the body opening is aligned with the second opening, the first lower end of the front suspension arm being in the second position, the fastener extending through the body opening and the first lower end to connect the first lower end to the at least one slide rail.

17. The snowmobile of claim 16, wherein:
the body portion is generally circular; and
the protrusion and the body opening are eccentric relative to the generally circular shape of the body portion.

18. The snowmobile of claim 16, wherein the at least one slide rail includes a first slide rail and a second slide rail.

19. The snowmobile of claim 18, wherein:
the at least one adjustable member includes a first adjustable member and a second adjustable member;
the first adjustable member is selectively connected to the first slide rail in one of the first orientation and the second orientation;
the second adjustable member is selectively connected to the second slide rail in one of the first orientation and the second orientation; and
the first and second adjustable members are in the same one of the first orientation and the second orientation.

\* \* \* \* \*